United States Patent
Suyama

(10) Patent No.: US 7,548,831 B2
(45) Date of Patent: Jun. 16, 2009

(54) APPARATUS AND METHOD FOR DETECTING ABNORMAL SIGN

(75) Inventor: Akihiro Suyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/854,919

(22) Filed: Sep. 13, 2007

(65) Prior Publication Data

US 2008/0198950 A1    Aug. 21, 2008

(30) Foreign Application Priority Data

Dec. 13, 2006    (JP) .............................. 2006-336263

(51) Int. Cl.
*G06F 17/18*    (2006.01)
*G06F 19/00*    (2006.01)
(52) U.S. Cl. ..................................... 702/181
(58) Field of Classification Search .................. 702/181
See application file for complete search history.

(56) References Cited

U.S. PATENT DOCUMENTS

2008/0004841 A1 *    1/2008    Nakamura ................. 702/186

FOREIGN PATENT DOCUMENTS

| JP | 11-338848 | 12/1999 |
|---|---|---|
| JP | 2001-312375 | 11/2001 |
| JP | 2004-054370 | 2/2004 |
| JP | 2004-213618 | 7/2004 |
| JP | 2005-141601 | 6/2005 |
| JP | 2005-309733 | 11/2005 |
| JP | 2006-173907 | 6/2006 |

* cited by examiner

*Primary Examiner*—Michael P. Nghiem
*Assistant Examiner*—Cindy H Khuu
(74) *Attorney, Agent, or Firm*—Amin, Turocy & Calvin, LLP

(57) ABSTRACT

There is provided with a method including: acquiring string data made up of a plurality of monitoring items from an apparatus to be monitored at predetermined or arbitrary time intervals; storing each acquired string data in a storage temporarily; calculating an average and variation for each of the monitoring items and correlation information indicating a correlation between the monitoring items by using each string data stored in the storage; normalizing the acquired string data by using the average and the variation of each monitoring item; calculating a distance from the correlation information for normalized string data by carrying out a computation using the normalized string data and the correlation information; and deciding whether or not there is an abnormal sign in the apparatus to be monitored depending on whether or not calculated distance falls within a confidence interval set in advance for a certain probability distribution.

10 Claims, 13 Drawing Sheets

| NUMBER OF ITEMS | 130 |
| --- | --- |
| PRESENCE/ABSENCE OF NON-AGED DETERIORATION ITEM | TRUE |
| AVERAGE | (B) |
| VARIANCE | (C) |
| CORRELATION COEFFICIENT MATRIX | (D) |
| CORRELATION COEFFICIENT INVERSE MATRIX | (E) |
| ACQUISITION INTERVAL | 60 |

(B) NUMBER OF ITEMS

| 2000 | 100 | ... | 0.1 |
| --- | --- | --- | --- |

(C) NUMBER OF ITEMS

| 10.5 | 1000 | ... | 2 |
| --- | --- | --- | --- |

(D) NUMBER OF ITEMS × NUMBER OF ITEMS

| 1 | 0.4 | ... | 0.1 |
| --- | --- | --- | --- |
| 0.4 | 1 | ... | ... |
| ... | ... | 1 | 0.9 |
| 0.1 | ... | 0.9 | 1 |

(E) NUMBER OF ITEMS × NUMBER OF ITEMS

| 1 | 0.4 | ... | 0.1 |
| --- | --- | --- | --- |
| 0.4 | 1 | ... | ... |
| ... | ... | 1 | 0.9 |
| 0.1 | ... | 0.9 | 1 |

(F)

| X1 | X2 | | X130 |
| --- | --- | --- | --- |
| Objects | Objects | ... | Cpu |
| Processes | Processes | | Percent |
| | Threads | | UserTime |

| UNIT SPACE ID | 0 | 1 | 2 |
|---|---|---|---|
| NUMBER OF ITEMS | 130 | 80 | 2 |
| PRESENCE/ABSENCE OF NON-AGED DETERIORATION ITEM | TRUE | FALSE | FALSE |
| AVERAGE | (B)-0 | (B)-1 | (B)-2 |
| VARIANCE | (C)-0 | (C)-1 | (C)-2 |
| CORRELATION COEFFICIENT MATRIX | (D)-0 | (D)-1 | (D)-2 |
| CORRELATION COEFFICIENT INVERSE MATRIX | (E)-0 | (E)-1 | (E)-2 |

(B)

| 0 | 2000 | 100 | ... | 0.1 |
| 1 | 50 | ... | 0.001 | |
| 2 | 1.02 | 1.10 | | |

(C)

| 0 | 2000 | 100 | ... | 0.1 |
| 1 | 50 | ... | 0.001 | |
| 2 | 1.02 | 1.10 | | |

(D)

0:
| 1 | 0.4 | ... | 0.1 |
| 0.4 | 1 | ... | ... |
| ... | ... | ... | 0.9 |
| 0.1 | ... | 0.9 | 1 |

1:
| 1 | ... | 0.2 |
| ... | 1 | ... |
| 0.2 | ... | 1 |

2:
| 1 | 0.4 |
| 0.4 | 1 |

(E)

0:
| 1 | 0.4 | ... | 0.1 |
| 0.4 | 1 | ... | ... |
| ... | ... | ... | 0.9 |
| 0.1 | ... | 0.9 | 1 |

1:
| 1 | ... | 0.2 |
| ... | 1 | ... |
| 0.2 | ... | 1 |

2:
| 1.19 | −0.48 |
| −0.48 | 1.19 |

APPARATUS AND METHOD FOR DETECTING ABNORMAL SIGN

CROSS-REFERENCE TO RELATED APPLICATIONS

This application is based upon and claims the benefit of priority from the prior Japanese Patent Applications No. 2006-336263 filed on Dec. 13, 2006, the entire contents of which are incorporated herein by reference.

BACKGROUND OF THE INVENTION

1. Field of the Invention

The present invention relates to an apparatus and method for detecting an abnormal sign for detecting an abnormal sign of an apparatus to be monitored, and relates to a technology of detecting an abnormal sign of a system (solution) made up of a single computer or a plurality of computers, for example.

2. Related Art

Examples of a method for detecting an abnormal sign of a computer using data obtained by monitoring a computer, especially data whose information source has varying features (non-steady data) include a method of carrying out a threshold judgment on monitored data using expertise (conventional first method), a method of estimating a situation of current monitoring data using a learning result with past similar monitoring data (conventional second method) and a method of carrying out detection/prediction according to a situation while changing a model (conventional third method).

Examples of literature describing the first conventional method include JP-A 2001-312375 (Kokai) (Patent Document 1). Examples of literature describing the second conventional method include JP-A 2005-309733 (Kokai) (Patent Document 2), JP-A 2004-213618 (Kokai) (Patent Document 3) and JP-A 11-338848 (Kokai) (Patent Document 4). Examples of literature describing the third conventional method include JP-A 2005-141601 (Kokai) (Patent Document 5) and JP-A 2004-54370 (Kokai) (Patent Document 6).

A threshold judgment using expertise as described in Patent Document 1 is considered to have relatively high accuracy, yet often accompanied by difficulties in advance threshold settings and it is extremely difficult to judge highly complicated situations.

Monitoring item data which can be acquired from computers and solutions (a plurality of networked computers) not only greatly vary in values and tendencies depending on individual computers and solutions but also include items whose behavior changes by a restart, and therefore the methods of Patent Documents 2 to 4 which perform detection and prediction through learning using similar monitoring data cannot perform analyses with highly accuracy.

The methods of Patent Documents 5 and 6 learn from quite near past data and can thereby detect anomalies with high accuracy even when individual conditions are different and the methods also suppress calculation cost using successive learning whereby past data is forgotten little by little. Especially, Patent Document 6 is a technique effective for non-steady data, too. However, setting of a threshold for judging an abnormal condition requires human judgment from output results.

If it is possible to design such a model that a normal operation space of a computer becomes an end of a space and cover all spaces in which the computer operate normally, Mahalanobis' distance is known to substantially follow a chi-square distribution, and therefore it is possible to judge abnormal signs without setting any threshold by using the Mahalanobis-Taguchi methods described in "Strategy of Research and Development—essence of splendid Taguchi methods" (Genichi Taguchi, Japanese Standards Association (2005) (Non-Patent Document 1)), but since it is extremely difficult to give data that can cover all normal spaces, setting a threshold requires trial and error.

SUMMARY OF THE INVENTION

According to an aspect of the present invention, there is provided with an abnormal sign detection apparatus comprising:

a data acquisition portion configured to acquire string data made up of a plurality of monitoring items from an apparatus to be monitored at predetermined or arbitrary time intervals;

a data temporary storage configured to temporarily store each acquired string data;

a data calculation portion configured to calculate an average and variation for each of the monitoring items by using each string data stored in the data temporary storage;

an information calculation portion configured to calculate correlation information indicating a correlation between the monitoring items by using each string data stored in the data temporary storage;

a normalization portion configured to normalize the string data acquired by the data acquisition portion using the average and the variation of each monitoring item;

a distance calculation portion configured to calculate a distance from the correlation information for normalized string data by carrying out a computation using the normalized string data and the correlation information; and an abnormal sign decision portion configured to decide whether or not there is an abnormal sign in the apparatus to be monitored depending on whether or not calculated distance falls within a confidence interval set in advance for a certain probability distribution.

According to an aspect of the present invention, there is provided with an abnormal sign detection apparatus comprising:

a first data acquisition portion configured to acquire first to nth string data each of which is made up of a plurality of monitoring items from an apparatus to be monitored at predetermined or arbitrary time intervals;

a first data temporary storage configured to temporarily store acquired first to nth string data;

a first calculation portion configured to calculate an average and a variation for each of the monitoring items corresponding each of the first to nth string data and calculate correlation information indicating a correlation between the monitoring items for each of the first to nth string data, by using first to nth string data stored in the first data temporary storage;

a first normalization portion configured to normalize each of the first to nth string data acquired by the first data acquisition portion using the average and the variation of each of the monitoring items corresponding each of the first to nth string data;

a first distance calculation portion configured to calculate a distance from the correlation information for each of normalized first to nth string data by carrying out a computation using the normalized first to nth string data and the correlation information corresponding to each of the normalized first to nth string data;

a probability calculation portion configured to calculate probabilities which correspond to respective calculated distances or less from the respective calculated distances and a certain probability distribution;

a second data acquisition portion configured to acquire a string data having the respective calculated probabilities as monitoring items at predetermined or arbitrary time intervals;

a second data temporary storage configured to temporarily store each acquired string data;

a second calculation portion configured to calculate an average and a variation for each of the monitoring items and second correlation information indicating a correlation between the monitoring items by using each string data stored in the second data storage;

a second normalization portion configured to normalize the string data acquired by the second data acquisition portion using the average and the variation of each of the monitoring items;

a second distance calculation portion configured to calculate a second distance from the second correlation information for normalized string data by carrying out a computation using the normalized string data and the second correlation information; and an abnormal sign decision portion configured to decide whether or not there is an abnormal sign in the apparatus to be monitored depending on whether or not calculated second distance falls within a confidence interval set in advance for the certain probability distribution.

According to an aspect of the present invention, there is provided with an abnormal sign detection method comprising:

acquiring string data made up of a plurality of monitoring items from an apparatus to be monitored at predetermined or arbitrary time intervals;

storing each acquired string data in a data temporary storage temporarily;

calculating an average and variation for each of the monitoring items and correlation information indicating a correlation between the monitoring items by using each string data stored in the data temporary storage;

normalizing the acquired string data by using the average and the variation of each monitoring item;

calculating a distance from the correlation information for normalized string data by carrying out a computation using the normalized string data and the correlation information; and deciding whether or not there is an abnormal sign in the apparatus to be monitored depending on whether or not calculated distance falls within a confidence interval set in advance for a certain probability distribution.

BRIEF DESCRIPTION OF THE DRAWINGS

FIG. 4 shows an example of information in the unit space storage 45 after creating a unit space;

FIG. 5 shows an example of information in the unit space storage 45 at the time of initialization;

FIG. 9 shows an example of information stored in the unit space storage 45;

DETAILED DESCRIPTION OF THE INVENTION

Table 1 shown at the end of "DETAILED DESCRIPTION OF THE INVENTION" is a list of examples of monitoring items of an abnormal sign detection apparatus according to a first embodiment of the present invention judged valid and classified into an aged deterioration type monitoring item and a non-aged deterioration type monitoring item. Table 1 corresponds, for example, to list information.

The first column shows the names of protocols or the like and the second column shows the names of monitoring items. There is also a case where a plurality of instances exist for one name. For example, Win32_Process.PageFileUsage has a value for all processes which have started. The "class" in the third column indicates whether the monitoring item is an "aged deterioration type monitoring item" or a "non-aged deterioration type monitoring item." "H/W" (HARDWARE) shows an aged deterioration type monitoring item and "S/W" (SOFTWARE) shows a non-aged deterioration type monitoring item. "H/W" corresponds to a first label and "S/W" corresponds to a second label. The fourth column shows an explanation (comment) on the monitoring item.

Here, the "aged deterioration type monitoring item" is the monitoring item (mainly a monitoring item on the condition of hardware) whose performance degrades due to aged deterioration. The aged deterioration type monitoring item corresponds to a monitoring item in which a first label is set. On the other hand, the "non-aged deterioration type monitoring item" is a monitoring item whose condition is completely initialized by a restart of the computer (mainly a monitoring item on the condition of software). The non-aged deterioration type monitoring item corresponds to a monitoring item in which a second label is set. The performance of "aged deterioration type monitoring item" of the former decreases by a restart of the computer, too.

Figure 1:
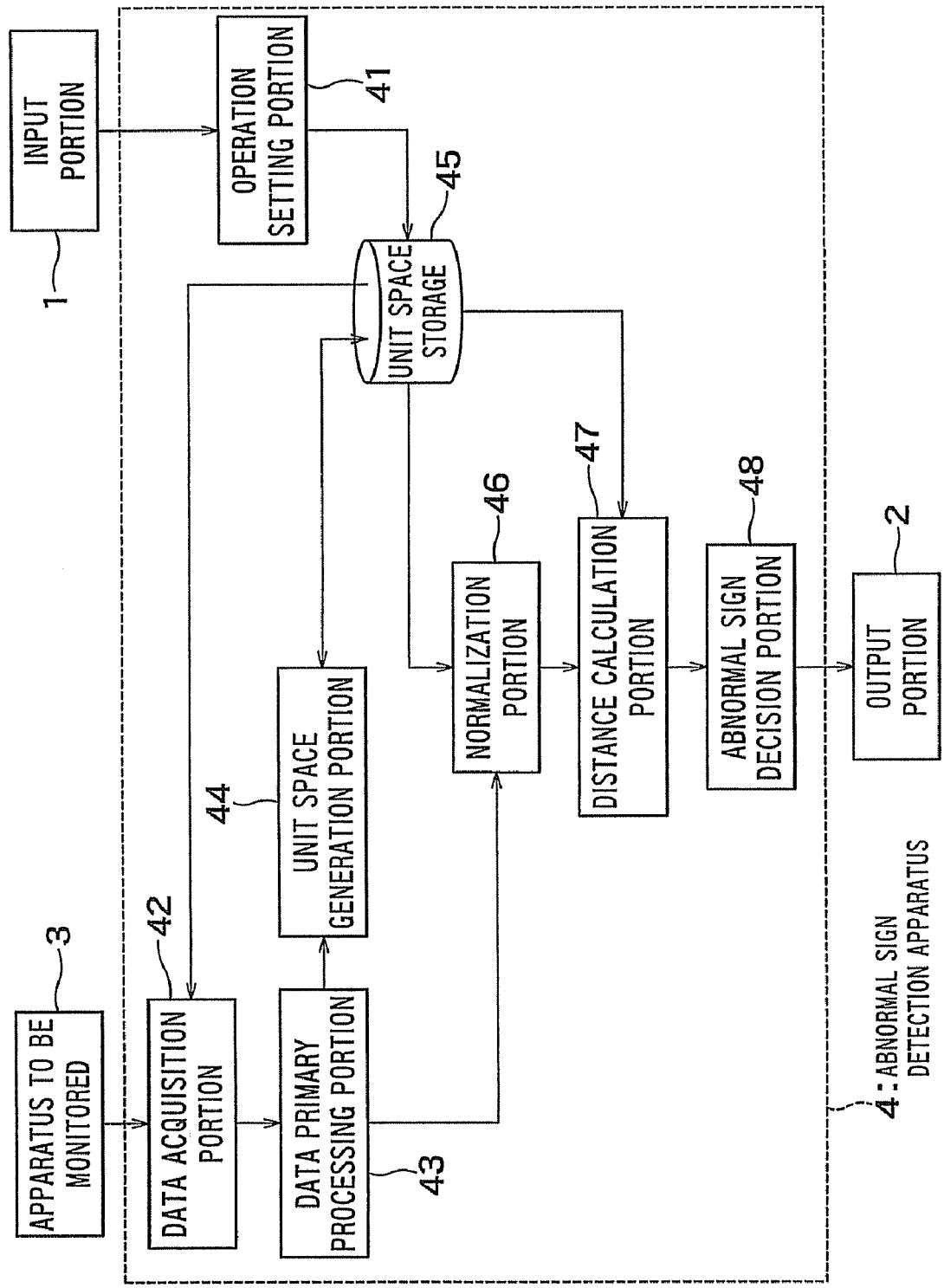
FIG. 1 shows the configuration of an abnormal sign detection apparatus according to a first embodiment of the present invention.

FIG. 1 shows the configuration of an abnormal sign detection apparatus according to a first embodiment of the present invention which acquires data of each monitoring item as shown in Table 1 from an apparatus to be monitored, inspects and detects the presence/absence of an abnormal sign.

The abnormal sign detection apparatus 4 in FIG. 1 receives information for which a plurality of monitoring items to be monitored are specified (monitoring item information) and an interval at which monitoring data is acquired about each monitoring item (data acquisition interval) from an input portion 1 and acquires data of each monitoring item from an apparatus to be monitored 3 according to the received monitoring item information and data acquisition interval as a monitoring string data (or string data). As the monitoring target, it is also possible to acquire a monitoring string data from a solution (system to be monitored) in which a plurality of apparatuses to be monitored are networked instead of the apparatus to be monitored 3. The abnormal sign detection apparatus 4 performs processing such as detection of an abnormal sign on the apparatus to be monitored 3 from the acquired monitoring string data (data of each monitoring item) and outputs the result of the processing through an output portion 2.

The input portion 1, output portion 2 and abnormal sign detection apparatus 4 can be realized by a general-purpose computer. For example, the acquisition of information by the input portion 1 may also be realized as input of information from an input device such as a mouse or a keyboard or may be realized as data input from an external storage apparatus or acquisition of data through a communication from an outside apparatus. The output portion 2 may also be configured as an apparatus such as a printer or LCD (liquid crystal display device). The abnormal sign detection apparatus 4 is the main unit of a computer and includes, for example, a CPU (central processing unit), a ROM and storage apparatus to store a program or the like and various apparatuses such as a RAM which is used as a work area in execution of a calculation or the like. The apparatus to be monitored 3 has network information, software information, hardware information or the like.

The abnormal sign detection apparatus 4 is provided with an operation setting portion 41, a data acquisition portion 42, a data primary processing portion 43, a unit space generation portion 44, a unit space storage 45, a normalization portion 46, a distance calculation portion 47 and an abnormal sign decision portion 48. The data primary processing portion 43 corresponds, for example, to a pre-processing portion. The abnormal sign decision portion 48 includes, for example, a probability calculation portion and the unit space generation portion 44 includes, for example, a data temporary storage, a data calculation portion, an information calculation portion and a restart detection portion.

The operation setting portion 41 records monitoring item information and data acquisition interval inputted from the input portion 1 into the unit space storage 45. Furthermore, the operation setting portion 41 records whether or not a non-aged deterioration type monitoring item is included (presence/absence of a non-aged deterioration type monitoring item) in the plurality of monitoring items specified in the monitoring item information.

The data acquisition portion 42 acquires a monitoring string data (or string data) made up of a plurality of monitoring items specified as the monitoring item information from the apparatus to be monitored 3 at the above described data acquisition intervals using WMI (Windows Management Instrumentation), SNMP (Simple Network Management Protocol), S.M.A.R.T. (Self-Monitoring, Analysis and Reporting Technology) or the like.

The data primary processing portion 43 performs data selection, data cleaning, data coding processing or the like which are pre-processing for "data mining" described in "Data Mining" (written by Pieter Adriaans, Dolf Zantinage, translated by Eiko Yamamoto, Kyoji Umemura, KYORITSU SHUPPAN CO., LTD (1998)) (Non-Patent Document 3). This pre-processing may also be referred to as primary processing. The monitoring string data successively inputted from the data acquisition portion 42 is subjected to primary processing.

The unit space generation portion 44 calculates an average and a variance for each monitoring item using a plurality of pieces of monitoring string data converted by the data primary processing portion 43 and also calculates a correlation coefficient matrix and correlation coefficient inverse matrix indicating a correlation between monitoring items. The variance is an example of variation. The correlation coefficient matrix and the correlation coefficient inverse matrix are examples of correlation information.

The unit space storage 45 stores an average and a variance for each monitoring item, a correlation coefficient matrix and a correlation coefficient inverse matrix calculated by the unit space generation portion 44. The set of the average, variance, correlation coefficient matrix, correlation coefficient inverse matrix corresponds to a unit space. The unit space generated from the monitoring string data collected when the apparatus to be monitored 3 is in a normal condition corresponds to a unit space in a normal condition.

FIG. 4(A) to FIG. 4(F) show examples of storage contents of the unit space storage 45. There are 130 monitoring items $X1$ to $X130$ and since non-aged deterioration type monitoring items exist in these monitoring items, the value of "presence/absence of non-aged deterioration item" is "TRUE." FIG. 4(F) shows the names of the respective monitoring items, FIG. 4(B) shows an average of monitoring data for each monitoring item, FIG. 4(C) shows a variance of monitoring data for each monitoring item, FIG. 4(D) shows an inter-monitoring-item correlation coefficient matrix and FIG. 4(E) shows an inverse matrix of the correlation coefficient matrix.

The normalization portion 46 normalizes the monitoring string data pre-processed by the data primary processing portion 43 using the average and the variance for each monitoring item stored in the unit space storage 45.

The distance calculation portion 47 calculates a distance from the unit space considering correlations between monitoring items and a distance from the unit space not in consideration of correlations between monitoring items using the monitoring string data normalized by the normalization portion 46 and the correlation coefficient inverse matrix stored in the unit space storage 45.

The abnormal sign decision portion 48 carries out an abnormal sign decision without any threshold (decision as to whether there is an abnormal sign or not) using the distance from the unit space considering the correlations between monitoring items calculated by the distance calculation portion 47 and the distance from the unit space not in consideration of the correlations between monitoring items and outputs the decision result or the like to the output portion 2.

Figure 2:
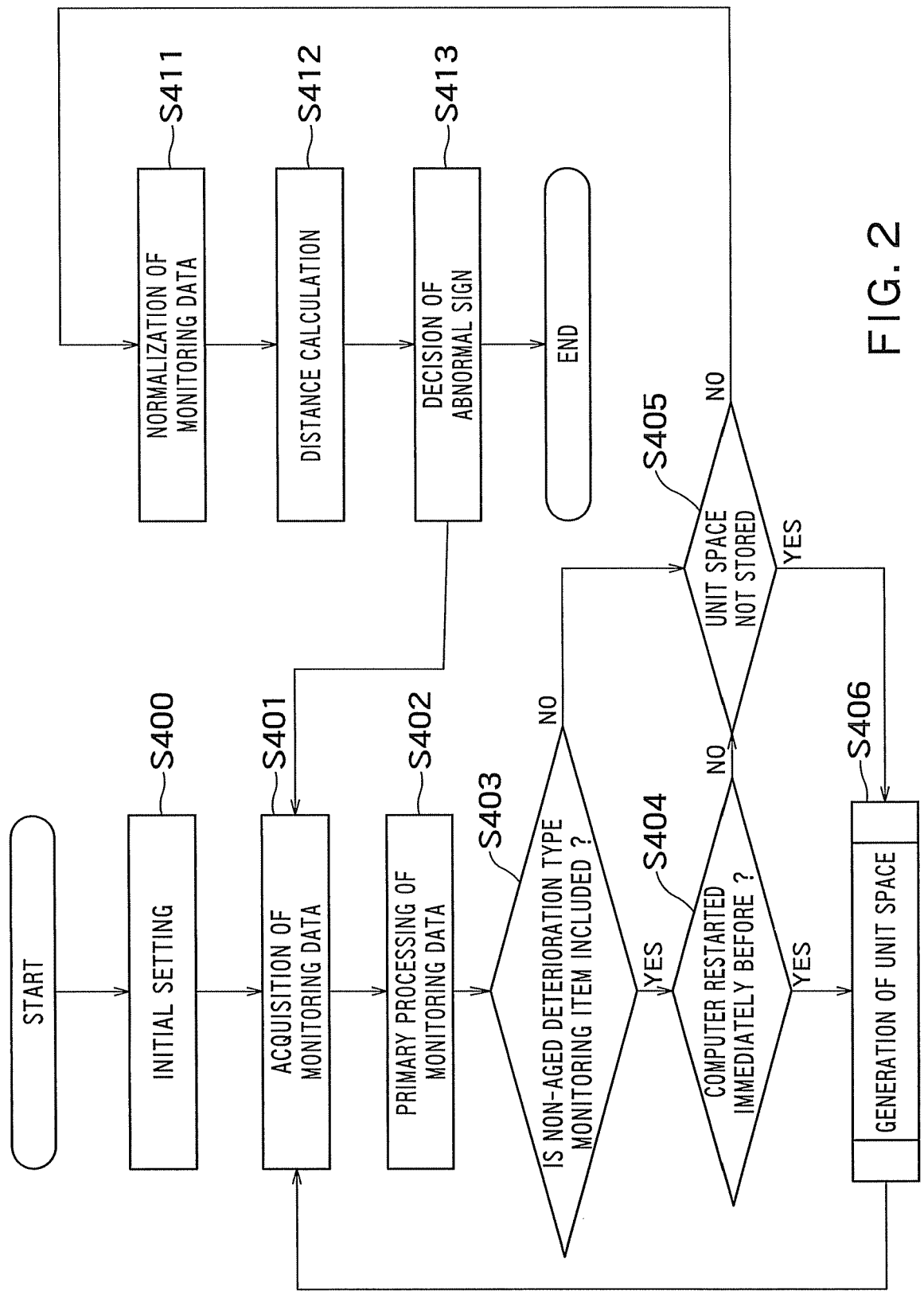
FIG. 2 is a flow chart showing the operation of the abnormal sign detection apparatus according to the first embodiment of the present invention.
Figure 3:
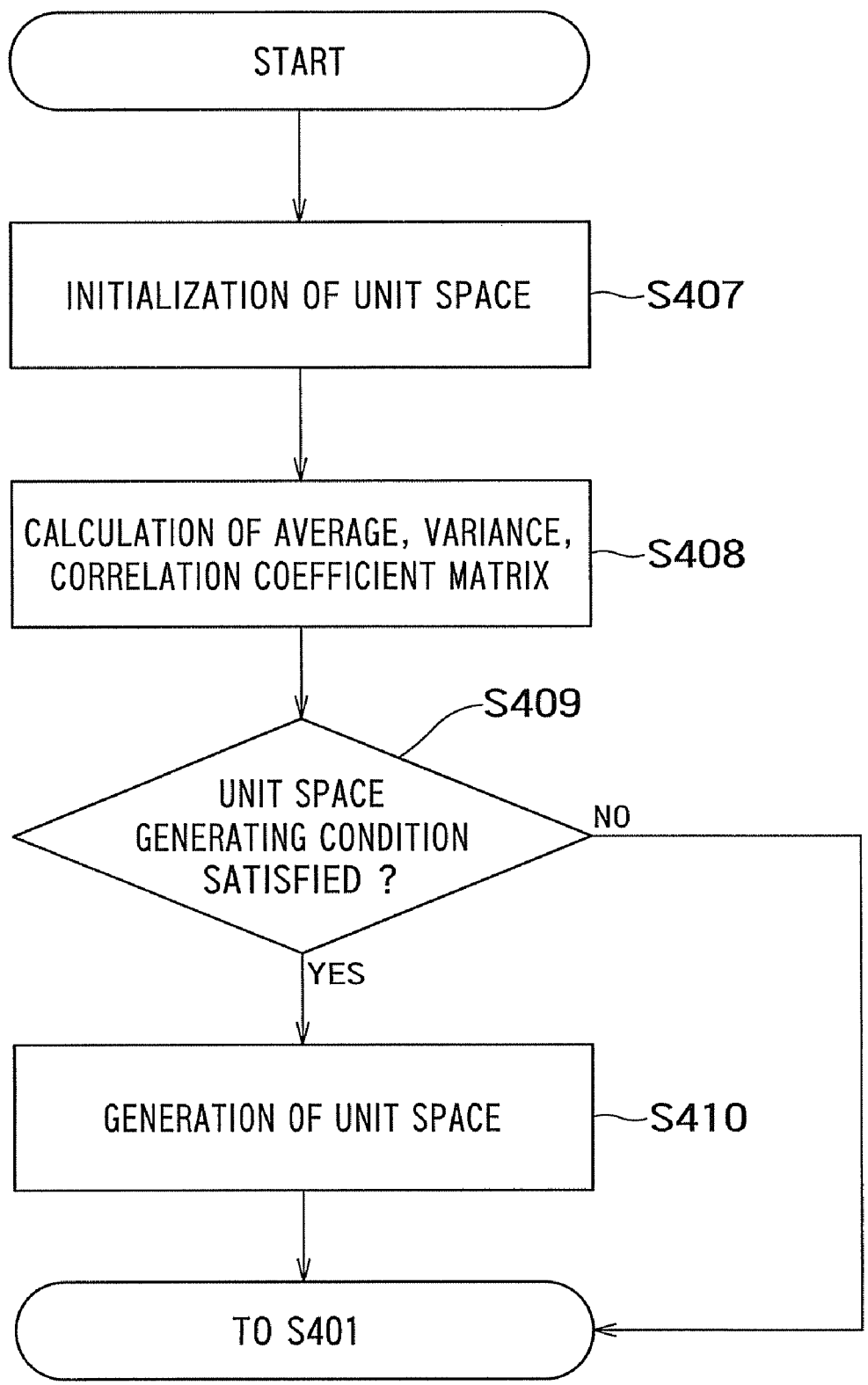
FIG. 3 is a flow chart showing the operation of the unit space generation portion.

An example of the operation of the abnormal sign detection apparatus 4 configured as shown above will be explained with reference to FIG. 2 and FIG. 3. FIG. 2 is a flow chart to explain an overview of the operation of the abnormal sign detection apparatus 4 and FIG. 3 is a flow chart to explain details of the unit space generation processing (S406) in FIG. 2. This example assumes that only one unit space is generated.

The operation setting portion 41 makes an initial setting of the operation of the abnormal sign detection apparatus by, for example, recording the monitoring item information and the data acquisition interval inputted from the input portion 1 into the unit space storage 45 or the like (S400). Details of the initial setting will be explained using FIG. 5.

Figure 5:
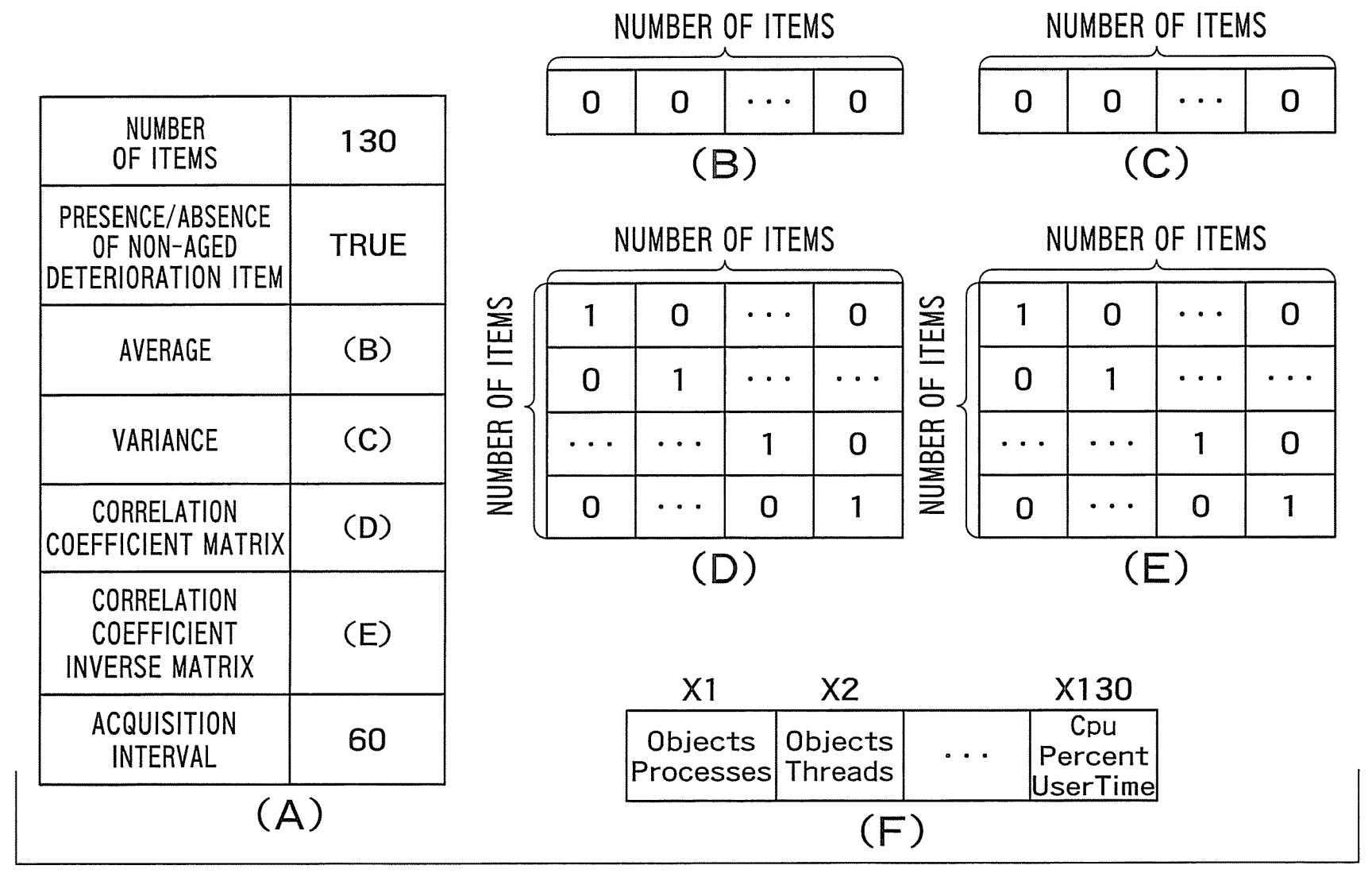

FIG. 5 shows an example when the monitoring items $X1$ to $X130$ are inputted from the input portion 1 as the monitoring item information and the data acquisition interval is set to 1 minute (60 seconds). First, the names or IDs of the monitoring item information ($X1$ to $X130$) inputted from the input portion 1 shown in FIG. 5(F) are stored in an array. Next, "130" is recorded as the "number of items" in FIGS. 5(A) and 60($s$) is recorded as the "acquisition interval." Furthermore, with reference to the class (H/W, S/W) in Table 1, it is judged whether or not non-aged deterioration type monitoring items are included in the above described 130 monitoring items and the judgment result is stored in the field of the "presence/absence of non-aged deterioration item" with binary data.

Here, since non-aged deterioration type monitoring items are included, "True" is recorded. As for the average and variance, a memory area in an array size corresponding in number to items is assigned ((B), (C)), and as for the correlation coefficient matrix and the correlation coefficient inverse matrix, a memory area in a matrix size corresponding to the number of items×the number of items is assigned ((D), (E)) and initialized so as to become a unit matrix. When the initialization instruction information instructing initialization of the unit space is inputted from the input portion 1, suppose the operation setting portion 41 initializes the unit space (average, variance, correlation coefficient matrix, correlation coefficient inverse matrix) stored in the unit space storage 45.

The data acquisition portion 42 acquires data of a plurality of monitoring items (monitoring string data) specified in the monitoring item information in the unit space storage 45 from the apparatus to be monitored 3 (S401). The monitoring items may be items provided by WMI, SNMP, S.M.A.R.T. or the like or may be independently developed items or may be items expected to be provided in future. The method of acquiring a monitoring string data can be anyone, but it is desirable to acquire a monitoring string data periodically (at predetermined time intervals) at data acquisition intervals stored in the unit space storage 45 and suppose that the monitoring string data is acquired at the data acquisition intervals in this example. However, the monitoring string data may also be acquired at arbitrary time intervals.

The data primary processing portion 43 applies primary processing (pre-processing) to the monitoring string data acquired by the data acquisition portion 42 (S402). Data selection which is an example of pre-processing may be realized using an existing (or general-purpose) attribute selection algorithm (which may be studied in the future) such as a filter method and a wrapper method or a narrowing-down rule using expertise. Data cleaning may be realized, for example, by preventing a monitoring string data at time t from being handled when monitoring data including obviously contradictory values that exceed upper and lower limits is included in the monitoring string data acquired at time t. Data coding is realized using existing techniques such as processing of determining a difference in items indicating a total number of times (e.g., a cumulative total count of errors which have occurred) between pieces of monitoring string data and converting the difference to the number of times per a unit time or using a method of substituting (or adding) a useful one variable (item) for (to) a plurality of monitoring items with knowledge of the target.

The unit space generation portion 44 calculates and stores a new unit space (average, variance, correlation coefficient matrix, correlation coefficient inverse matrix) according to need. More specifically, first, the unit space generation portion 44 checks whether or not a non-aged deterioration type monitoring item is included in the monitoring string data outputted from the data primary processing portion 43 (S403). When a non-aged deterioration type monitoring item is included (YES in S403), the unit space generation portion 44 checks whether or not the apparatus to be monitored 3 has been restarted immediately before acquisition of a monitoring string data (S404). When the apparatus to be monitored 3 has been restarted immediately before (YES in S404), the flow moves to a unit space generation process (S406). On the other hand, when the apparatus to be monitored 3 has not been restarted immediately before (NO in S404) or no non-aged deterioration type monitoring item is included (NO in S403), the unit space generation portion 44 checks whether or not the unit space to be generated is stored in the unit space storage 45 (S405) or when the unit space to be generated is not stored in the unit space storage 45 (YES in S405), the flow moves to the unit space generation process (S406).

In the unit space generation process, the following information out of the information stored in the unit space storage 45 as shown in FIG. 3 is initialized first (S407). That is, the average and variance of all monitoring items in the unit space to be generated are set to 0, the number of read monitoring string data (number of read data) is set to 0 and the correlation coefficient matrix and the correlation coefficient inverse matrix between the monitoring items are transformed into unit matrices. Suppose this step S407 is performed only when the flow reaches S407 through "YES" in S404 and not performed when the flow passes through S405.

Next, the number of read data stored in the unit space storage 45 is incremented by 1 and the average, variance, correlation coefficient matrix stored in the unit space storage 45 are updated (S408). At this time, calculations are carried out by giving an extremely small amount of noise so that the variance does not become 0. Noise preferably follows a Gaussian distribution but noise may also follow other distribution functions. The effect of giving noise is reported in "Creation of Abnormality Diagnostic System of Racing Vehicles using Telemetering" (Koichi Onishi, Collection of 10th Quality Engineering Research Presentation (2002)) (Non-Patent Document 2).

Whether a predetermined unit space generating condition is met or not is judged (S409) and if the condition is not met (NO in S409), the flow returns to the monitoring data acquisition process in step S401 without generating any unit space (after this, the flow returns to S407 through "YES" in S405). Here, suppose the predetermined unit space generating condition is that the number of read data should be at least the number of data (specified number of data) equal to or more than three times the number of monitoring items. The number of specified data may be preset to a specific value by the designer or may also be determined according to a function with the number of monitoring items or the like taken into consideration or may be specified by the user from the input portion 1.

In step S409, when the predetermined unit space generating condition is met (YES in S409), a correlation coefficient inverse matrix is calculated using the correlation coefficient matrix stored in the unit space storage 45, stored in the unit space storage 45 and a unit space (average, variance, correlation coefficient matrix, correlation coefficient inverse matrix) is thereby generated (S410). FIG. 4 shown above shows an example of the condition of the unit space storage 45 after the unit space is generated.

In steps S408 to S410 which are the processes to generate the unit space, an average, variance, and correlation coefficient matrix may also be calculated after a number of pieces of monitoring string data which meet the above described predetermined unit space generating condition are stored in the storage apparatus using any method other than the above described efficient method using a temporary average (average which is successively updated in S408). Moreover, when a calculation is carried out after a number of pieces of string data which meet the above described predetermined unit space generating condition are accumulated, it is also possible to calculate an average and variance, then normalize all the accumulated monitoring string data using Expression (1) which will be described later and determine a variance/covariance matrix from all the normalized monitoring string data. This is because the variance/covariance matrix calculated from each normalized monitoring string data corresponds to the correlation coefficient matrix.

When it is not necessary to generate any unit space (NO in S405), that is, (1) when no non-aged deterioration type monitoring item is included or (2) when one or more non-aged deterioration type monitoring item is included but not restarted immediately before and the unit space has already been generated, the flow moves to S411 and the normalization portion 46 normalizes the primary processed monitoring string data using Expression (1) in step S402.

[Expression 1]

$$X(t) = \{(x_1(t)-m_1)/\sigma_1, \ldots, (x_k(t)-m_k)/\sigma_k\} \quad (1)$$

$X_i(t)$, $m_i$ and $\sigma_i$ denote the primary processing data value, average and standard deviation of the ith monitoring item respectively. When the standard deviation is 0, Expression (1) cannot be calculated, and therefore quite a small amount of noise is given in the calculations of the average and variance in step S408.

The distance calculation portion 47 calculates a distance from the unit space considering correlations between monitoring items and a distance from the unit space not in consideration of correlations between monitoring items using the monitoring string data normalized in step S411 and the correlation coefficient inverse matrix stored in the unit space storage 45 (S412). As a specific example, the calculation expression considering the correlations between the monitoring items is shown as Expression (2) and the calculation expression not in consideration of the correlations between the monitoring items is shown as Expression (3).

[Expression 2]

$$D_M(t)^2 = 1/k \cdot X(t) \cdot R^{-1} \cdot X(t)^T \quad (2)$$

Expression (2) is an example of a calculation function of the distance in consideration of both the correlations between the monitoring items and the variation in the value of each monitoring item and is called "Mahalanobis' distance" in Taguchi methods. "X(t)" is a monitoring string data at time t normalized in step S411 and $X(t)^T$ is a transposition matrix of X(t). Furthermore, "$R^{-1}$" is an inverse correlation coefficient matrix and "k" is the number of monitoring items.

Mahalanobis' distance is a distance measure considering correlations between variables (between monitoring items), and therefore despite the fact that there is a correlation that when the CPU load is high, the CPU temperature is also high, if, for example, monitoring string data indicating that the CPU temperature is high though the CPU load is low is obtained, a large value can be taken. In this way, because Mahalanobis' distance has high sensitivity for data having a tendency different from that of the unit space, it is considered very useful in detecting abnormal signs.

It is generally considered extremely rare that Mahalanobis' distance given by Expression (2) takes a value of 6 or greater, and therefore it is considered that the threshold should be preferably set to 6, but when data used to generate the unit space is not enough, a variation in the distance due to a variation in the values of variables (monitoring items) themselves, instead of a variation in correlations between variables (monitoring items), has a great contribution, and this causes a problem that the threshold cannot necessarily be determined. Especially, when a computer is targeted as an apparatus to be monitored, it is difficult to obtain monitoring string data with substantially all normal patterns that can take place, and there is a problem that determining a threshold becomes like a trial-and-error approach. Therefore, in order to cancel out a variation in the distance due to a variation in values of variables (monitoring items) themselves, this embodiment calculates a difference from the distance not in consideration of correlations between monitoring items as will be described later.

Therefore, upon detecting abnormal signs in a computer (e.g., personal computer) or solution to be monitored, if the environment allows all values of monitoring items in a normal condition to be covered when a unit space is generated, Expression (4) which will be described later may be assumed to be $Y(t) = D_M(t)^2$.

[Expression 3]

$$D_E(t)^2 = 1/k \cdot X(t) \cdot E \cdot X(t)^T \quad (3)$$

Expression (3) is an example of a calculation function of the distance not in consideration of correlations between monitoring items (that is, the distance only considering variations in the value of each monitoring item) and is called a "Euclid distance." A feature thereof is a division by the number of monitoring items k to match the distance in Expression (2). X(t) is monitoring string data at time t normalized in step S411 and E is a unit matrix which has the same size as the correlation coefficient matrix stored in the unit space storage 45.

Finally, the abnormal sign decision portion 48 carries out a calculation to decide the presence/absence of abnormal signs using the distance determined in S412, decides the presence/absence of abnormal signs based on whether or not the value obtained through the calculation (level of abnormal sign or probability) falls within a predetermined statistically confidence interval in a certain probability distribution (S413) and outputs the decision result or the like to the output portion 2. The presence/absence of abnormal signs is decided in this way without setting a threshold. Details will be explained below.

Generally, factors that determine a threshold in a trial-and-error fashion include (A) that monitoring data is accompanied by a non-steady variation and (B) that because the monitoring data used to generate the unit space does not cover all normal conditions, an extremely large distance is calculated even in a normal condition.

In the case of (A), a method whereby the data primary processing portion 43 assumes the calculations of the difference or the logarithm of the monitoring data and gives the calculated values to the unit space generation portion 44 is also one of techniques for solving a problem. In the case of (B), problems are solved by generating a unit space that covers all the normal conditions, but it is extremely difficult to cover substantially all the normal conditions that can take place. Therefore, suppose Expressions (4-1) and (4-2) which allow an abnormal analysis to be carried out with high accuracy even in an incomplete unit space by calculating only a variation in correlations between monitoring items by taking advantage of the fact that tiny shifts which are different from a normal condition are quite often produced in the tendency of correlations between monitoring items when anomalies occur in the computer or the solution.

[Expression 4]

$$Y(t) = D_M(t)^2 / D_E(t)^2 \quad (4\text{-}1)$$

$$Y(t) = \text{LOG}(D_M(t)^2 / D_E(t)^2) \quad (4\text{-}2)$$

Expression (4-1) and Expression (4-2) calculate only the amount of variation relative to the unit space (the amount excluding the variation in the value for each monitoring item) by dividing the distance in consideration of correlations between monitoring items (Mahalanobis' distance) by the distance not in consideration of correlations between monitoring items (Euclid distance).

Expression (4-1) is a calculation expression which is effective when used in the case where monitoring data $x_i$ does not include non-steady data (e.g., data whose value decreases or increases cumulatively) and Expression (4-2) is a calculation expression effective when used in the case where monitoring data $x_i$ includes non-steady data. The use of Expression (4-2) allows non-steady data to be handled even if the data primary processing portion 43 does not calculate the difference or the logarithm of the monitoring data or the like.

Expression (4-1) and Expression (4-2) take the value of approximately $0<Y(t)<1$ in a normal condition, but in any condition other than the normal condition, $Y(t)$ becomes equal to or more than 1 and can also even take infinity, but the value varies depending on the number of monitoring items. Therefore, when an attempt is made to decide the presence/absence of abnormal signs through a threshold decision, problems may occur.

Therefore, assuming that $Y(t)$ follows a certain probability distribution, the presence/absence of abnormal signs is decided based on the statistical confidence not depending on the number of monitoring items.

[Expression 5]

$$F(x) = P(X \le x) \qquad (5)$$
$$= \int_{-\infty}^{x} f(u)du$$

Expression (5) is an expression of a distribution function and expresses a probability that variable X will take a value equal to or below x. $F(x)$ is an arbitrary probability density function. $F(x)$ corresponds to the level of abnormal sign or a probability.

Expression (4-1) or Expression (4-2) may also be considered to approximately express the distance when a normal unit space is generated. In the case of Mahalanobis' distance, since it is known that the distance can be approximated to follow a chi-square distribution, Expression (5) can be transformed into Expression (6) below by substituting $k \cdot Y(t)$ for x.

$$F(k \cdot Y(t)) = (\Gamma_{Y(t) \cdot k/2}(k/2))/(\Gamma(k/2)) \quad Y(t) > 0 \qquad (6)$$
$$= 0 \qquad\qquad\qquad\qquad\qquad Y(t) \le 0$$

The case where $F(k \cdot Y(t))$ becomes, for example, equal to or greater than 99% or 95% which corresponds to a range outside the statistically confidence interval (that is, the case where it becomes equal to or greater than 0.99 or 0.95) is decided to be a case where an abnormal sign is present. That is, the presence/absence of the abnormal signs is decided by whether or not $F(k \cdot Y(t))$ falls within statistical confidence of 99% or statistical confidence of 95%. However, since noise signals at an extreme level are often inputted in an actual environment, it is desirable to decide the case where the moving average of the calculation result of Expression (6) becomes equal to or greater than 99% or 95% which is outside the statistically confidence interval as the presence of an abnormal sign.

The abnormal sign decision portion 48 hands over to the output portion 2 at least any one of $D_M(t)^2$ (distance in consideration of correlations between monitoring items) calculated in S412, $F(t)$ (level of abnormal sign) calculated in S413, moving average of $F(t)$ and decision result of the presence/absence of abnormal signs and the output portion 2 outputs the information that has been handed over.

Figure 10:
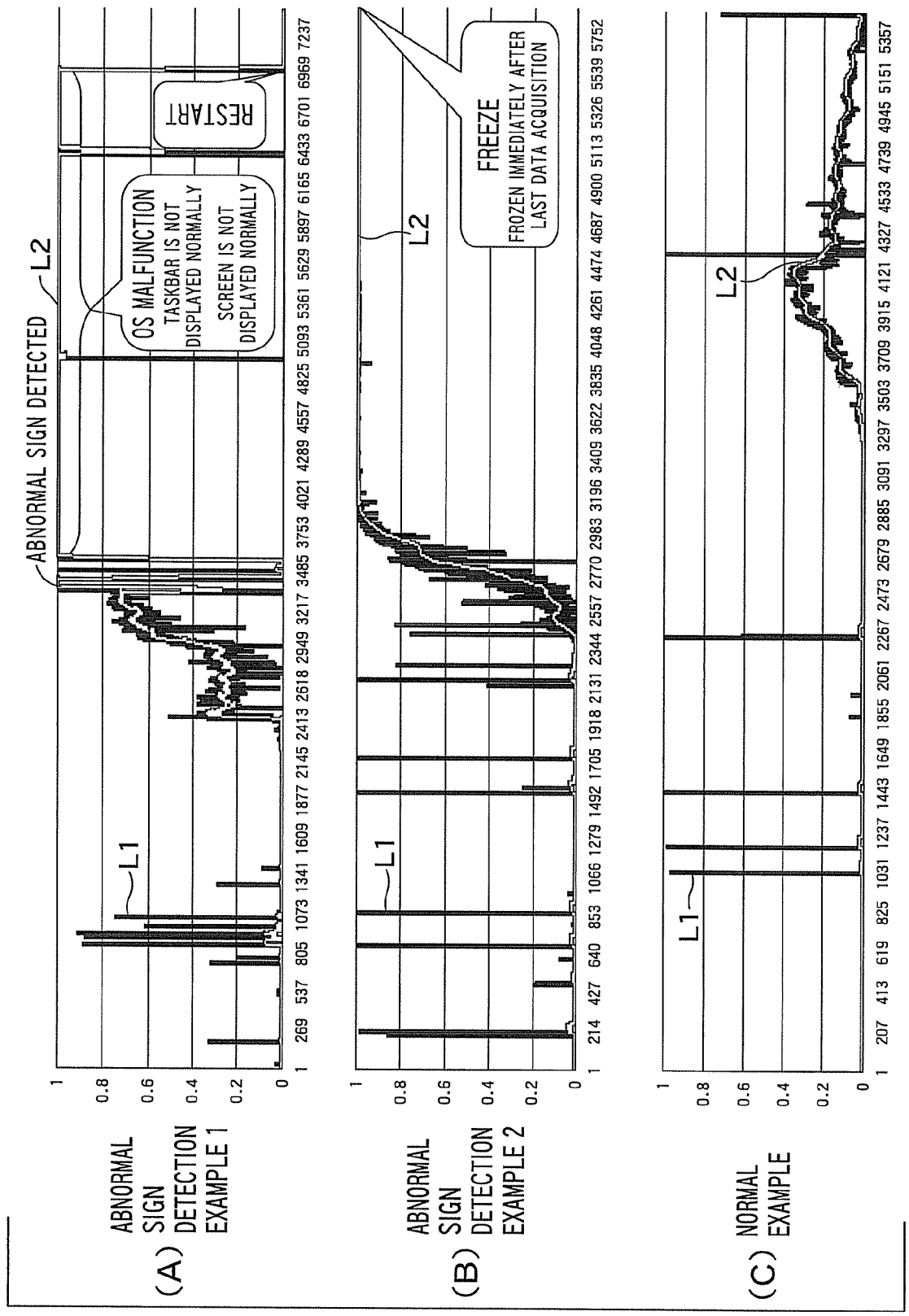
FIG. 10 shows output examples of the abnormal sign detection apparatus.

FIG. 10(A) to FIG. 10(C) show examples of the output result from the output portion 2. FIG. 10(A) and FIG. 10(B) show examples where abnormal signs are detected and FIG. 10(C) shows a normal example. The horizontal axis shows a time sequence index and the unit is minutes (that is, monitoring string data is acquired every minute). The vertical axis shows the value (level of abnormal sign) of $F(x)$ in Expression (5). Suppose that a unit space is generated from monitoring string data obtained from time sequence index 1 to time sequence index 2000 (approximately 1.5 days). Line L1 denotes $F(x)$ at time t and polyline L2 (outlined line) shows a one-hour moving average of $F(x)$.

In the case where the one-hour moving average takes a value of 0.99 or above (outside the confidence interval of 0.99), the abnormal sign detection apparatus 4 assumes it as detection of an abnormal sign and gives a user a warning. The method of giving a warning may be e-mail directed to an administrator or the like, a display on a console, output to a log, execution of a predetermined arbitrary program instruction or notification by means of a pop-up window, sound or the like.

FIG. 10(B) will be explained in detail by converting it to actual dates and times. The unit space is generated from 2000 pieces of monitoring string data of 11:00 on July 6 to 20:28 on July 7. The level of abnormal sign increases almost monotonously from 22:06 on July 6 and an abnormal sign is detected at 16:23 on July 8. From then on, the value of $F(x)$ continues to be 1 until 12:58 on July 10 when the personal computer actually freezes.

As the output method by the output portion 2, data may be outputted in a graph format as shown in FIG. 10(A) to FIG. 10(C) or numerical values may be enumerated or data may be written into a file or stored in a RAM (Random Access Memory).

The abnormal sign detection apparatus according to this embodiment makes the most of a chi-square distribution which is an approximate distribution function with the Mahalanobis' distance, which is a distance in consideration of correlations between monitoring items and thereby decides the presence/absence of an abnormal sign without requiring any threshold, but when calculations are carried out using another distance measure, it is desirable to use a distribution function of the distance. Furthermore, Expression (5) is transformed into Expression (6) assuming that Mahalanobis' distance can be approximated to a chi-square distribution, but even in the cases of other probability distributions such as an F distribution, a gamma distribution, if they are mathematically transformable equivalently to a chi-square distribution, they may be treated as equivalents.

For example, in the case of an F distribution, $$F(x) = B_Y(m_1/2, m_2/2)/B(m_1/2, m_2/2) \qquad (7)$$

($y = m_1 \cdot x / (m_2 \cdot m_1 \cdot x)$, B is a beta function, $B_Y$ is an incomplete beta function)

if $x = Y(t)$ and $m_2 = \infty$ are given, $F(x)$ is an equivalent to a chi-square distribution.

In the same way, in the case of a gamma distribution, $$F(x) = 1 - [\mathrm{EXP}(-x/\beta)][\Sigma i \alpha - 1] \qquad (8)$$

if $x = k \cdot Y(t)$, $\alpha = k/2$ and $\beta = 2$ are given, $F(x)$ becomes equivalent to a chi-square distribution.

As described above, this embodiment expands the Mahalanobis-Taguchi method of Non-Patent Document 1, calculates a distance corresponding to a unit space (amount of variation in correlation) (see Expressions 4-1, 4-2) from a function using a distance in consideration of correlations between monitoring items and a distance not in consideration of correlations between monitoring items, detects an abnormal sign depending on whether or not the calculated distance falls within a predetermined confidence interval in a predetermined probability distribution, and therefore it is possible to perform abnormal sign detection with high accuracy without determining any threshold. Furthermore, it is possible to quickly detect an abnormal sign condition and give a warning.

Figure 6:
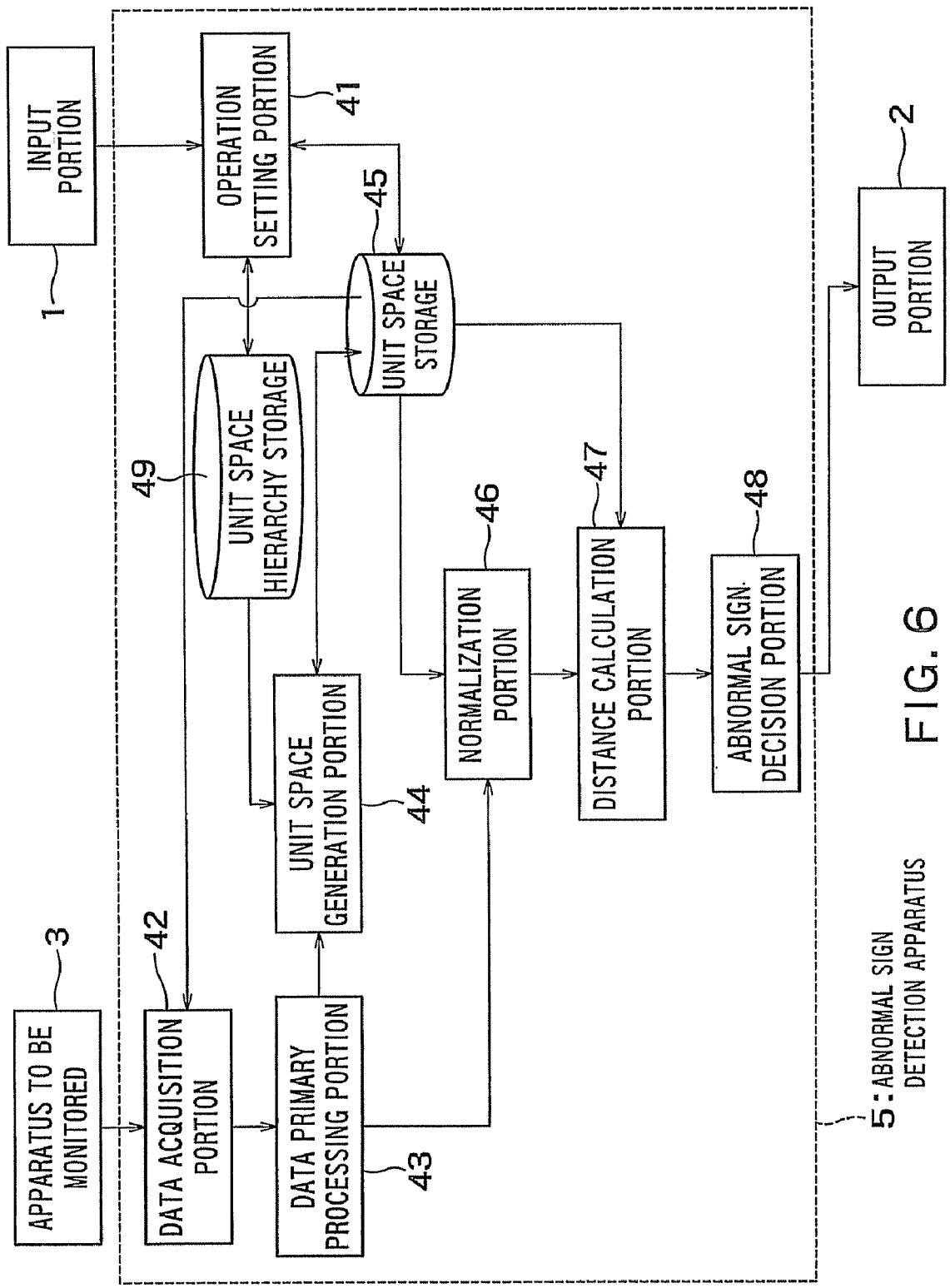
FIG. 6 shows the configuration of an abnormal sign detection apparatus according to a second embodiment of the present invention.

FIG. 6 shows a schematic configuration of an abnormal sign detection apparatus according to a second embodiment of the present invention. This corresponds to the abnormal sign detection apparatus 4 in FIG. 1 with a unit space hierarchy storage 49 added thereto. Parts in FIG. 6 equivalent to those in FIG. 1 are assigned the same reference numerals. A data acquisition portion 42 includes, for example, a first data acquisition portion and a second data acquisition portion, a unit space generation portion 44 includes, for example, a first data temporary storage and a second data temporary storage, a first calculation portion, a second calculation portion and a restart detection portion, a normalization portion 46 includes, for example, a first normalization portion and a second normalization portion, a distance calculation portion 47 includes, for example, a first distance calculation portion and a second distance calculation portion, and an abnormal sign decision portion 48 includes, for example, a probability calculation portion.

Before explaining this abnormal sign detection apparatus, a term "unit space hierarchical structure" newly introduced in this embodiment will be explained. A multi-stage Mahalanobis-Taguchi method has been developed as an applied research of the Mahalanobis-Taguchi method in Non-Patent Document 1 described in "Prior Art." The multi-stage Mahalanobis-Taguchi method is a method whereby items are classified into several groups to avoid multicollinearity, Mahalanobis' distances are calculated respectively and the Mahalanobis' distances obtained are treated as new items to calculate Mahalanobis' distances. The unit space hierarchical structure defines the hierarchical relation of the unit space and this embodiment causes the abnormal sign detection apparatus to execute processing similar to that of the multi-stage Mahalanobis-Taguchi method using this unit space hierarchical structure. This makes it possible to reduce the calculation cost for generating a unit space, divide a monitoring target into a plurality of blocks and easily discover regions where abnormal signs exist.

Figure 11:
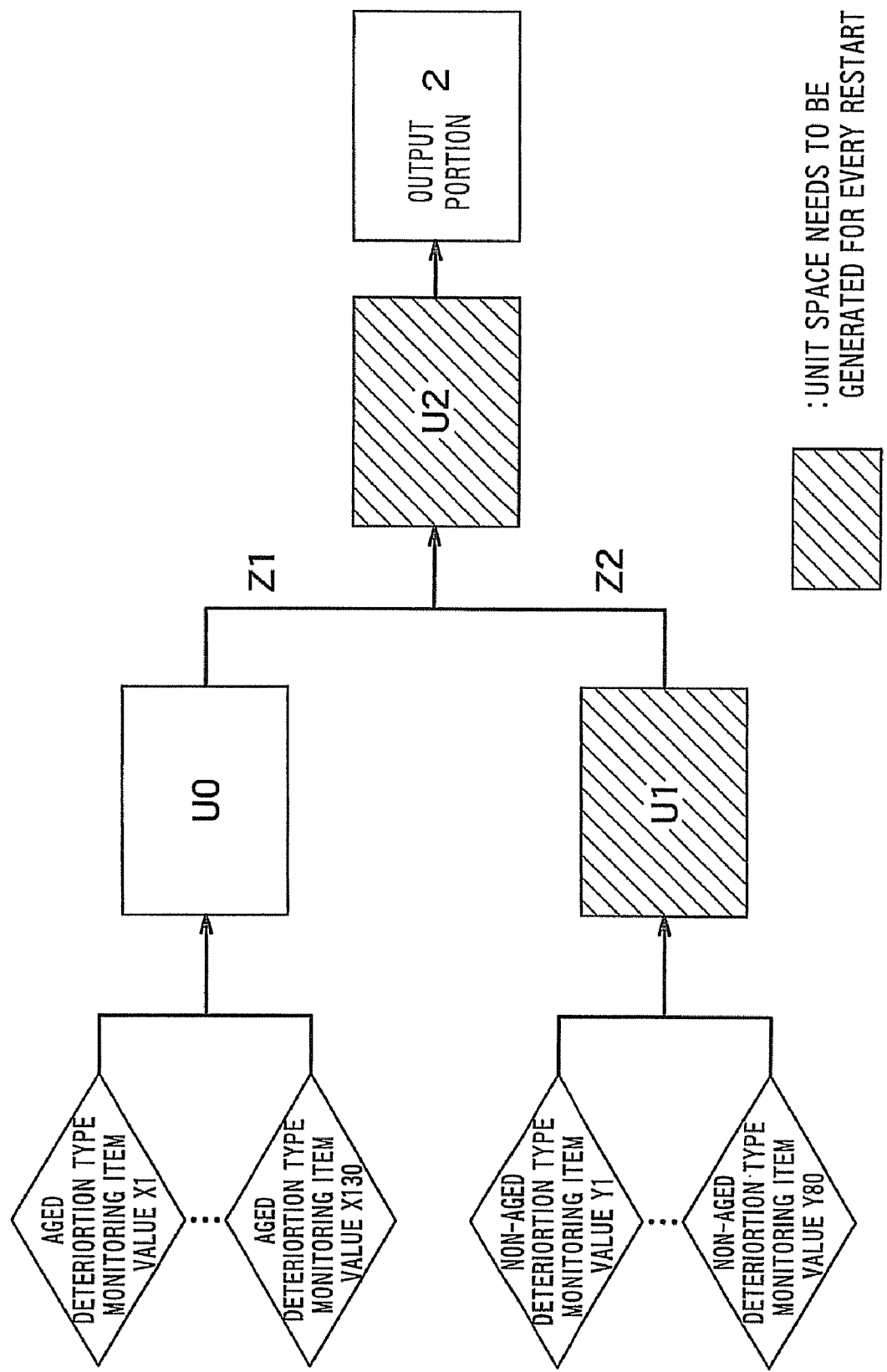
FIG. 11 illustrates a unit space hierarchical structure.

FIG. 11 is an example of a unit space hierarchical structure constructed for the purpose of reducing the calculation cost for generating a unit space. This unit space hierarchical structure consists of a unit space U2 at the top of the hierarchy (root node) and unit spaces U0, U1 which are child nodes of the root node. A first level of abnormal signs is obtained from the string data of aged deterioration type monitoring items X1 to X130 and the unit space U0 and a second level of abnormal signs is obtained from the string data of non-aged deterioration type monitoring items Y1 to Y80 and the unit space U1. These first and second levels of abnormal signs are handled as the string data of monitoring items Z1, Z2, decision results of the presence/absence of abnormal signs or the level of abnormal signs or the like are obtained from the string data of the monitoring items Z1, Z2 and the unit space U2 as in the case of the first embodiment and outputted from the output portion 2. Here, the unit space U0 is generated from the string data of the periodically acquired aged deterioration type monitoring items X1 to X130 like the first embodiment, the unit space U1 is generated from the string data of the periodically acquired non-aged deterioration type monitoring items Y1 to Y80 like the first embodiment and the unit space U2 is generated from the string data of the periodically acquired monitoring items Z1, Z2 like the first embodiment. The unit space U1 must be generated for every restart of the apparatus to be monitored because the unit space U1 is based on the non-aged deterioration type monitoring items, while the unit space U0 is based on only the aged deterioration type monitoring items, and therefore need not be regenerated even if an apparatus to be monitored is restarted. Since the unit space U2 is based on the unit space U1, it must be regenerated when the apparatus to be monitored is restarted. Such a unit space hierarchical structure is described in the hierarchical structure information which is shown in FIG. 8 and this hierarchical structure information is stored in the unit space hierarchy storage 49 in FIG. 6.

Figure 12:
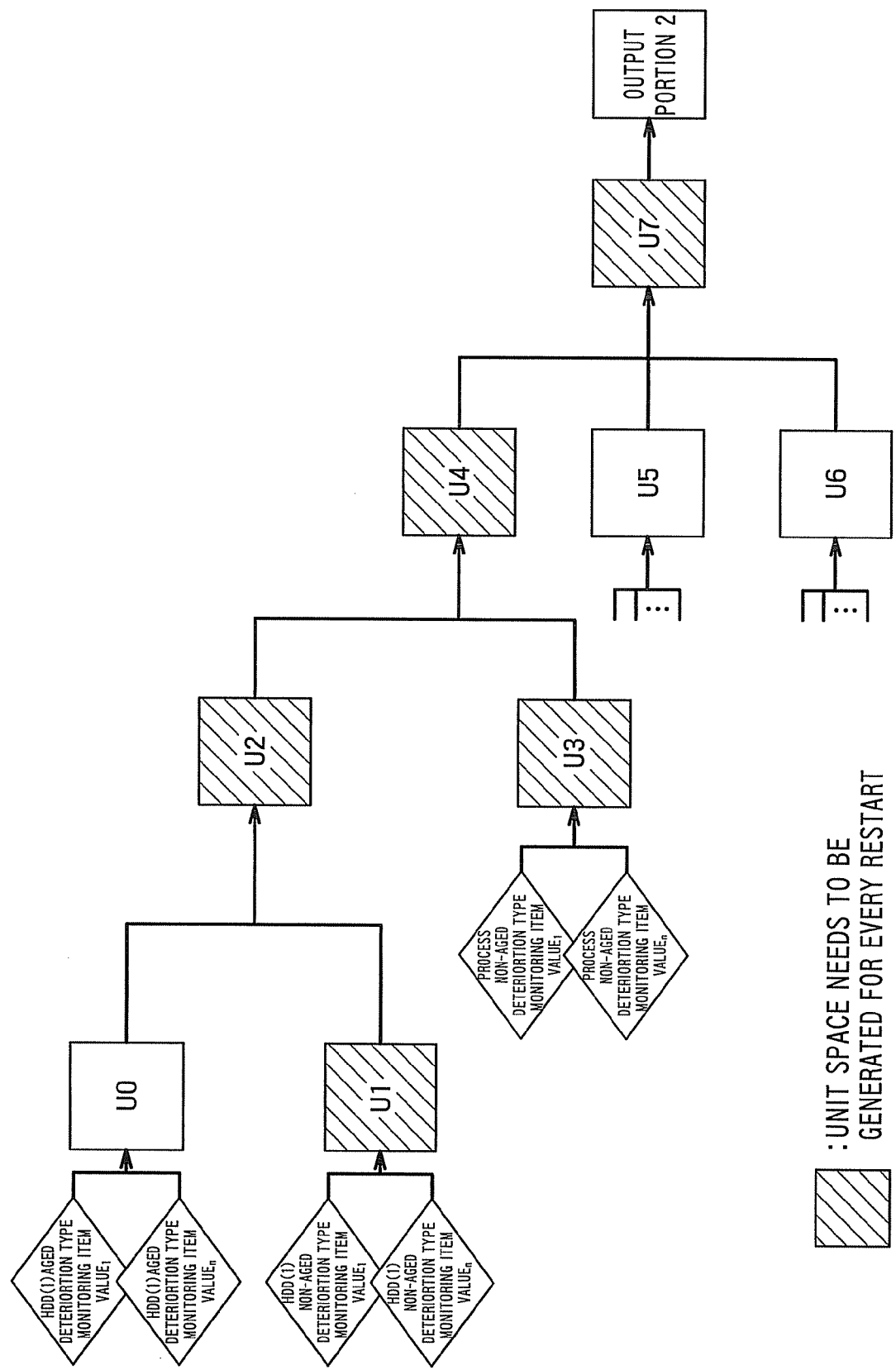
FIG. 12 illustrates another unit space hierarchical structure.
Figure 13:
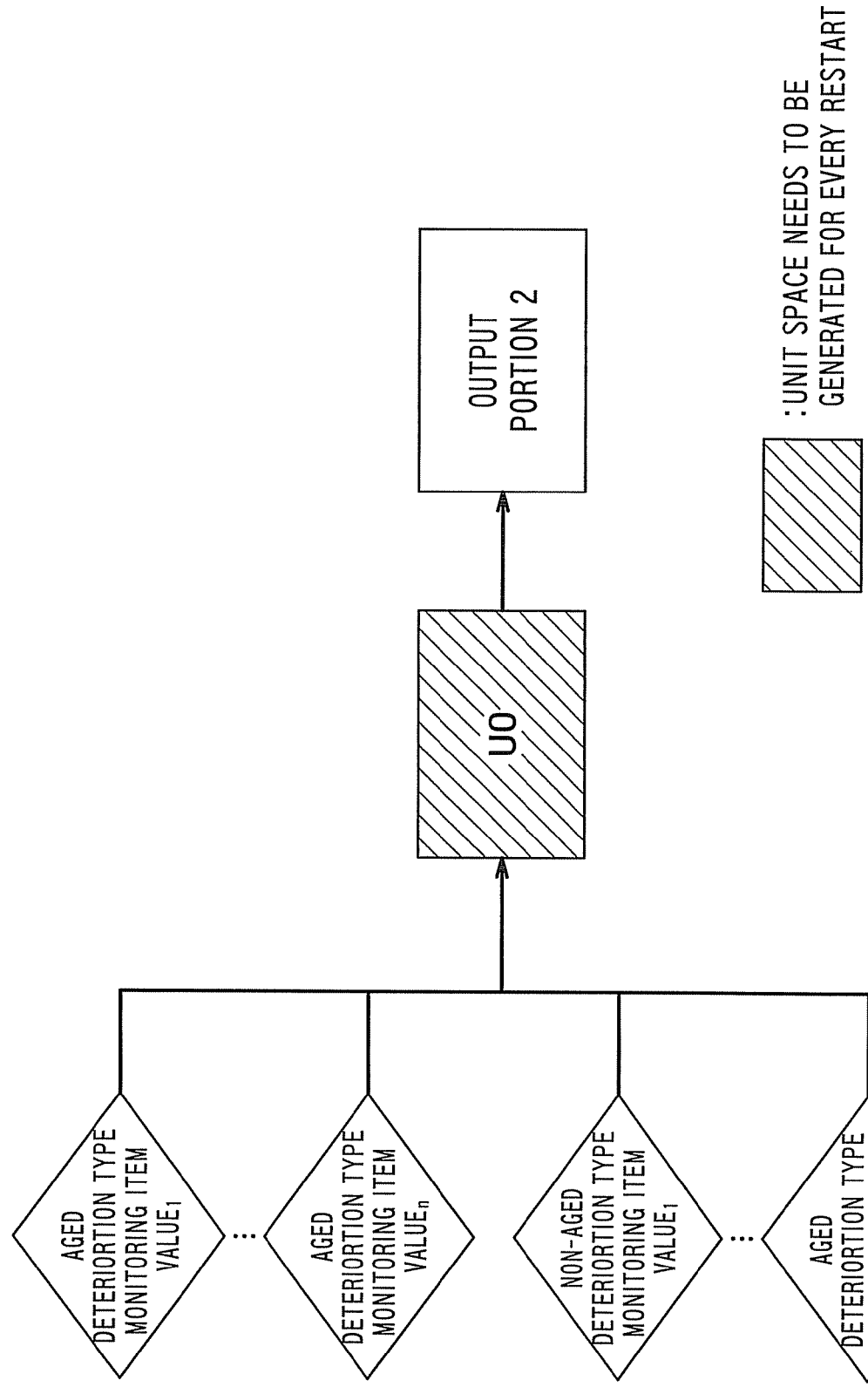
FIG. 13 illustrates a further unit space hierarchical structure.

FIG. 11 shows an example of the unit space hierarchical structure intended to reduce the calculation cost for generating a unit space and FIG. 12 shows an example of the unit space hierarchical structure intended for both reduction of the calculation cost for generating a unit space and division of the apparatus to be monitored into blocks to easily discover regions of abnormal signs. Though the apparatus to be monitored involved in the unit spaces U0, U1 is the same, the apparatus to be monitored involved in the unit spaces U3, U5, U6 is different from the apparatus to be monitored involved in the unit spaces U0, U1 and when an abnormal sign is detected from the unit space U7 at the output portion 2, it is possible to easily discover the apparatus to be monitored in which the abnormal sign occurred by analyzing the unit space hierarchical structure and the output from each unit space. As shown in FIG. 13, when a hierarchical structure having only one stage is defined, this becomes equivalent to the first embodiment.

Figure 7:
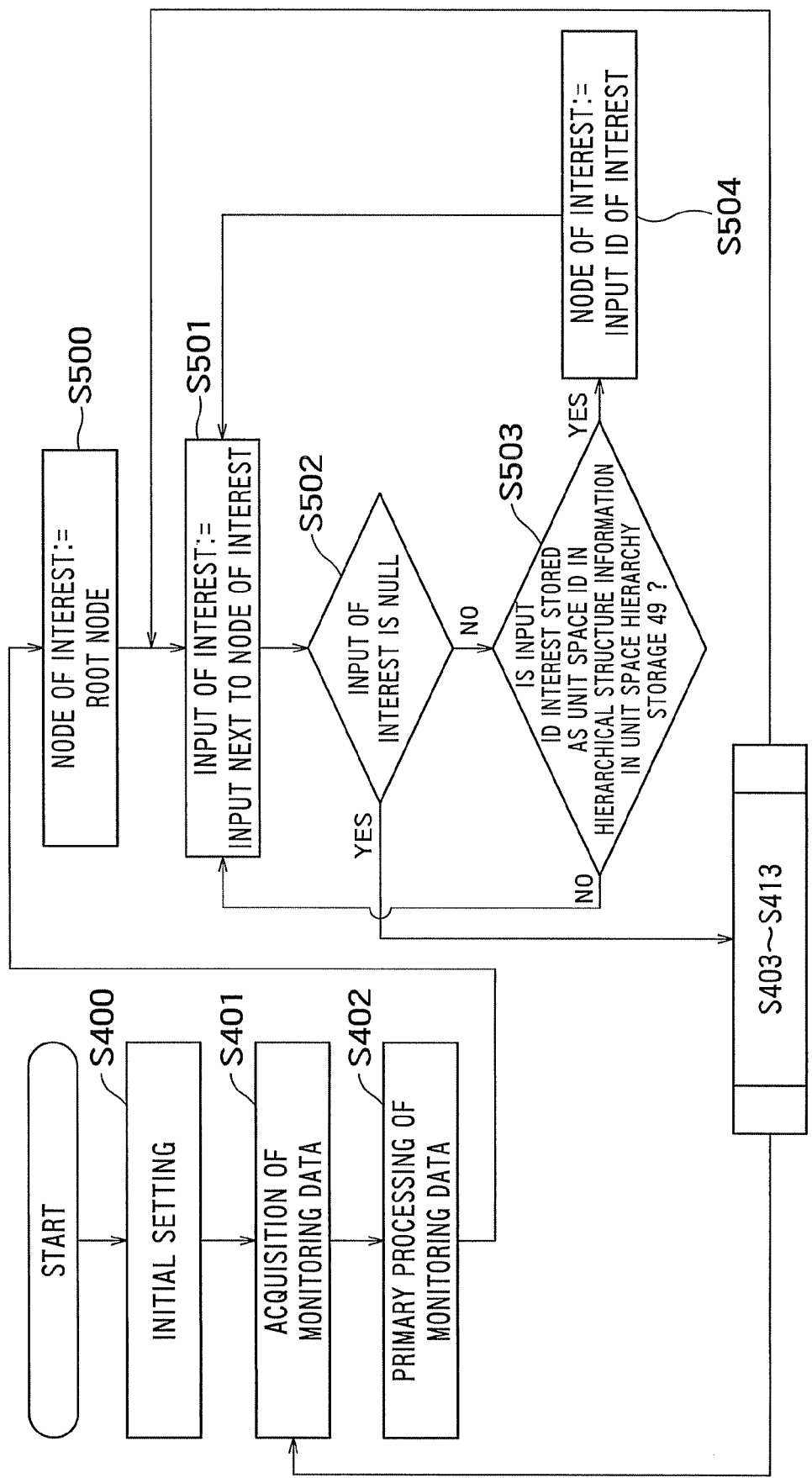
FIG. 7 is a flow chart showing the operation of the abnormal sign detection apparatus according to the second embodiment of the present invention.

Hereinafter, the operation of the abnormal sign detection apparatus in FIG. 6 will be explained using FIG. 6 to FIG. 9 and FIG. 11. FIG. 7 is a flow chart illustrating the operation of the abnormal sign detection apparatus in FIG. 6. Steps in which processes equivalent to those in the flow chart in FIG. 2 used in the first embodiment are assigned the same reference numerals (S400 to S413).

Figure 8:
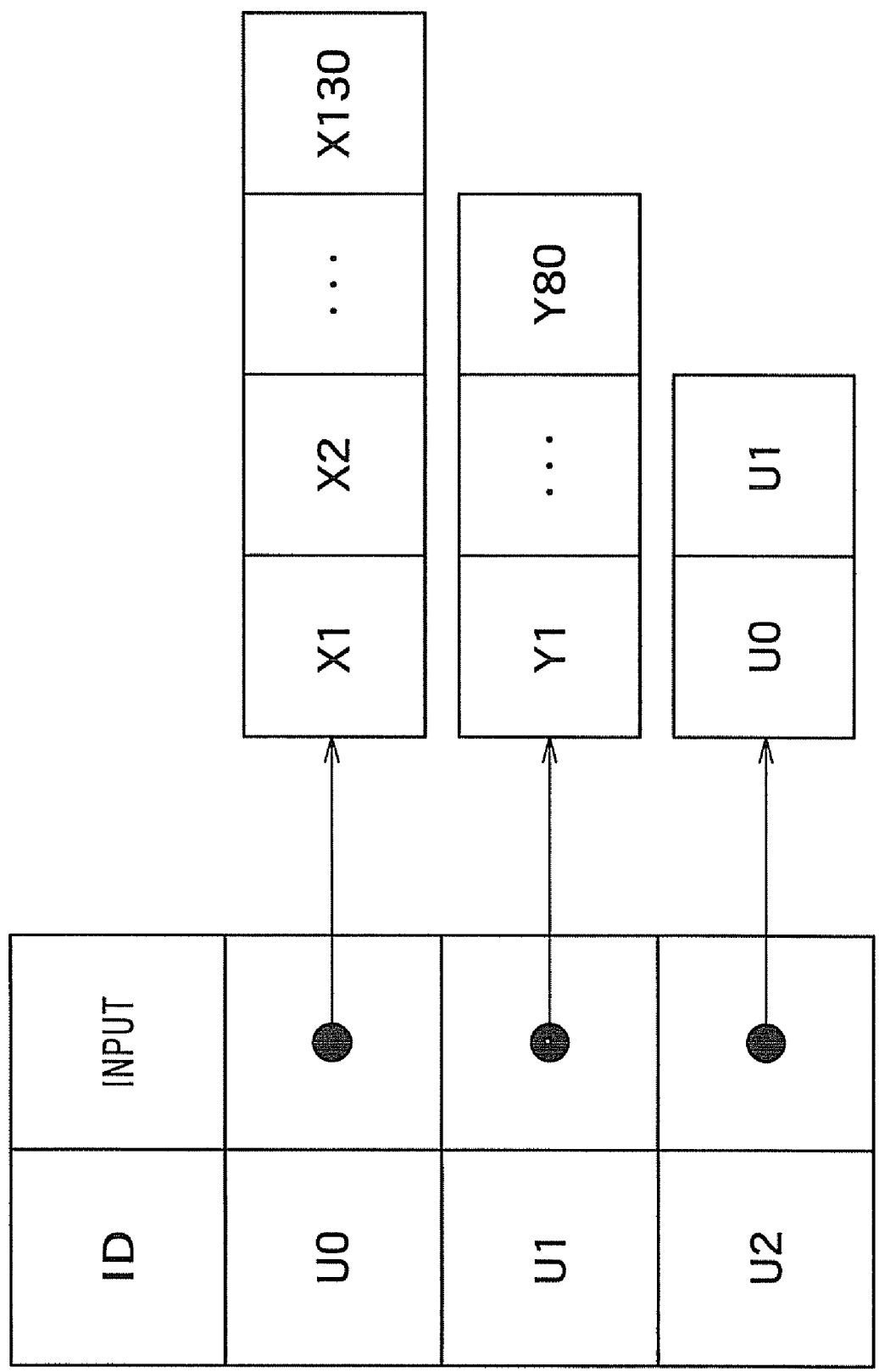
FIG. 8 shows an example of hierarchical structure information.

First, the operation setting portion 41 records monitoring item information inputted from the input portion 1 and data acquisition interval into the unit space storage 45 and also records hierarchical structure information (suppose the hierarchical structure information in FIG. 8 is inputted here) inputted from the input portion 1 into the unit space hierarchy storage 49 to thereby perform an initial setting of the abnormal sign detection apparatus (S400). Furthermore, when initialization instruction information of the unit space is inputted, information related to the unit space ID (see FIG. 8) indicated in the initialization instruction information stored in the unit space storage 45 (average, variance, correlation coefficient matrix, correlation coefficient inverse matrix) is initialized.

When all monitoring items in the hierarchical structure information are assigned to the unit space ID, this is equivalent to the abnormal sign detection apparatus according to the first embodiment. Furthermore, when a plurality of unit space IDs exist but a hierarchical structure is not defined (in FIG. 8, hierarchy relationship between U2 and U0, U1 is defined), this is equivalent to the abnormal sign detection apparatus according to the first embodiment performing processing independently for each unit space (performing the processing explained in the first embodiment in parallel).

Since the methods of generating the unit spaces U0 to U2, calculation of the level of abnormal signs and decision on the presence/absence of abnormal signs or the like are equal to those in the first embodiment, explanations thereof will be omitted and the processing of hierarchically determining the output will be explained based on the example in FIG. 11.

A hierarchical structure can be considered as a tree structure where those close to the input are assumed to be "leaf nodes" and those close to the output are assumed to be "root nodes." In FIG. 11, U2 corresponds to a root node and U0 and U1 correspond to leaf nodes. Therefore, using a scanning algorithm of the tree structure, it is possible to recursively calculate a level of abnormal signs (F(x)) and the presence/absence of abnormal signs starting from nodes closer to the output.

First, U2 which is nearest to the output is assumed to be a node of interest (S500).

The unit space generation portion 44 refers to the unit space hierarchy storage 49 and when the input of the node of interest U2 is checked, U0 is referenced first (NO in S501, S502). U0 which is referenced first is recorded in the hierarchical structure information in the unit space hierarchy storage 49 as the unit space ID (YES in S503), and therefore U0 is changed to a node of interest (S504).

Here, the hierarchical structure information of the unit space hierarchy storage 49 is referenced and the input of the node of interest U0 is checked as in the case of U2 (S501). Since X1 which is referenced first is not recorded as the unit space ID in the hierarchical structure information in the unit space hierarchy storage 49 (NO in S502, NO in S503), X1 is proven to be a monitoring item. In the same way, when it is proven that items up to X130 are monitoring items with respect to the input of U0 (YES in S502), that is, when it is proven that there is no lower node of U0, processes of S403 to S413 are carried out and finished using the distance in consideration of correlations between the monitoring items which are the result in S412 (see Expression (2), Expression (4-1), Expression (4-2)) or the level of abnormal signs in S413 as the output of U0 and the flow returns to the process of U2.

At the node of interest U2, the input is checked continuously (S501) and U1 is proven to be the next input. Since U1 is stored as the unit space ID of the unit space hierarchy storage 49 as in the case of U0 (NO in S502, YES in S503), U1 is changed to a node of interest (S504). Hereinafter, processing similar to that for U0 is performed, the output of U1 is obtained and the flow returns to the processing of the node of interest U2.

Since there is no next input at the node of interest U2 (YES in S502), processes in S403 to S413 are carried out using the output of U0 and the output of U1 as the inputs of U2 and the distance in consideration of correlations between the monitoring items which is the result in S412 (see Expression (2), Expression (4-1), Expression (4-2)) or the level of abnormal signs which is the result in S413 is used as the output of U2.

Examples of the information stored in the unit space storage 45 through the above described processing are shown in FIG. 9(A) to FIG. 9(E).

According to the second embodiment, a monitoring item is classified according to whether or not it is a monitoring item whose state is completely initialized through a restart of a computer or solution and for only a unit space including items whose state is not completely initialized through a restart of the computer or solution, the unit space is regenerated at the time of restart and it is thereby possible to reduce the calculation cost necessary to detect abnormal signs. Furthermore, it is also possible to dynamically change the unit space to judge abnormal signs of the computer with less calculation cost.

The abnormal sign detection apparatus in FIG. 1 and FIG. 6 can also be realized using a general-purpose computer apparatus as the basic hardware as described above. That is, each block in the abnormal sign detection apparatus in FIG. 1 and FIG. 6 can be realized by causing a processor mounted on the above described computer apparatus to execute a program. At this time, the abnormal sign detection apparatus in FIG. 1 and FIG. 6 may also be realized by installing the above described program in the computer apparatus or may also be realized by storing the program in a storage medium such as CD-ROM or distributing the above described program through a network and installing this program in the computer apparatus as appropriate. Furthermore, the unit space storage in FIG. 1 and FIG. 6 and the unit space hierarchy storage in FIG. 6 can also be realized using a memory incorporated in or externally added to the above described computer apparatus, a hard disk or a storage medium such as CD-R, CD-RW, DVD-RAM, DVD-R as appropriate.

The present invention is not limited to the above described embodiments as they are and the components can be modified and implemented within a range not departing from the essence thereof in the implementation stage. Furthermore, various inventions can be formed by combining a plurality of components disclosed in the above described embodiments as appropriate. For example, some components may be deleted from all the components shown in the embodiments. Furthermore, components used across the different embodiments may also be combined as appropriate.

TABLE 1

| SORCE | NAME | CLASS | Comment |
| --- | --- | --- | --- |
| S.M.A.R.T. | Raw Read Error Rate | H/W | This item shows the rate of errors that occur when data is read from the hard disk. When the value is lower than a threshold, there is an anomaly in the magnetic disk in the hard disk or the magnetic head. |
| S.M.A.R.T. | Throughput Performance | H/W | Overall throughput of the hard disk. When this value is equal to or below a |

TABLE 1-continued

| SORCE | NAME | CLASS | Comment |
|---|---|---|---|
| | | | threshold, there is a high probability that the hard disk may have an anomaly. |
| S.M.A.R.T. | Spin Up Time | H/W | Average time taken after the hard disk starts current application and rotation until a specified number of rotations is reached. |
| S.M.A.R.T. | Start/Stop Count | H/W | The number of times the spindle motor of the hard disk has rotated/stopped. |
| S.M.A.R.T. | Reallocated Sectors Count | H/W | The number of bad sectors which have been reallocated (data is transferred to a specially reserved area). |
| S.M.A.R.T. | Seek Error Rate | H/W | The rate at which the magnetic head tried to move to a track where there is target data but failed (seek error). This is caused by the heat of the hard disk and damage to the servomechanism or the like. When the value is low, there is a possibility that there may be a problem on the surface of the hard disk and the mechanical system of the hard disk. |
| S.M.A.R.T. | Seek Time Performance | H/W | Average time required for a seek by the magnetic head. |
| S.M.A.R.T. | Power-On Hours | H/W | Total time of current application to the hard disk from the factory default setting. A decrease in this value relative to a threshold indicates a decrease of MTBF (mean time between failures). |
| S.M.A.R.T. | Spin Retry Count | H/W | Number of retries made to increase spinning up of the disk to a specified speed. |
| S.M.A.R.T. | Recalibration Retries | H/W | The number of times calibration operation of the hard disk (function to automatically correct an off-track phenomenon due to heat) is retried (calibration already failed once). |
| S.M.A.R.T. | Device Power Cycle Count | H/W | The number of times the power of the hard disk has |

TABLE 1-continued

| SORCE | NAME | CLASS | Comment |
|---|---|---|---|
| | | | been turned ON/OFF. |
| S.M.A.R.T. | Soft Read Error Rate | H/W | |
| S.M.A.R.T. | G-Sense Error Rate | H/W | The rate of errors which have occurred with the impact made on the hard disk. Impacts are sensed by an impact sensing sensor incorporated in the hard disk. |
| S.M.A.R.T. | Power-Off Retract Count | H/W | The number of times the hard disk is forcibly stopped and the magnetic head is retracted urgently caused by pulling out of a power cable or the like. This gives a large load on the hard disk. |
| S.M.A.R.T. | Load/Unload Cycle Count | H/W | The total number of times the loading/unloading mechanism caused the magnetic head to retract from the magnetic disk surface to a retraction area and then returned to the magnetic disk surface. |
| S.M.A.R.T. | Temperature | S/W | The current temperature of the hard disk. Generally, the maximum temperature at which the operation is guaranteed is 55° C. |
| S.M.A.R.T. | Hardware ECC recovered | H/W | |
| S.M.A.R.T. | Reallocation Event Count | H/W | The number of times reallocation of sectors occurred. This count is added to the count even if the processing fails. |
| S.M.A.R.T. | Current Pending Sector Count | S/W | The total number of sectors which have currently anomalies and are waiting for reallocation. This value decreases if some sectors succeed in reading later. |
| S.M.A.R.T. | Off-Line Scan Uncorrectable Sector Count | H/W | The total number of irrecoverable sectors discovered at the time of off-line scanning. When this value increases, there is definitely a problem on the surface of the magnetic disk. |
| S.M.A.R.T. | UltraDMA CRC Error Count | S/W | The number of ORC errors which have occurred during data transfer in an UltraDMA mode. |

TABLE 1-continued

| SORCE | NAME | CLASS | Comment |
|---|---|---|---|
| S.M.A.R.T. | Write Error Rate (Multi Zone Error Rate) | S/W | The total number of errors discovered during writing of data. |
| S.M.A.R.T. | Soft Read Error Rate | H/W | The rate of errors which occur when the program reads data from the magnetic disk surface. |
| S.M.A.R.T. | Data Address Mark Error | H/W | Indicates the frequency of DAM (data address mark)-related errors. |
| S.M.A.R.T. | Run Out Cancel | H/W | Indicates the frequency of ECC (error correcting code) error. |
| S.M.A.R.T. | Soft ECC Correction | H/W | The total number of errors corrected by software ECC. |
| S.M.A.R.T. | Thermal Asperity Rate | H/W | The total number of errors caused by a thermal asperity phenomenon (phenomenon produced when the magnetic head collides with protrusions of a magnetic medium, generating heat and producing a possibility of misleading data detection). |
| S.M.A.R.T. | Flying Height | H/W | Floating height of the magnetic head |
| S.M.A.R.T. | Spin High Current | H/W | Amount of high current used for spinning up of the drive |
| S.M.A.R.T. | Spin Buzz | H/W | The number of times a buzz routine (processing of striking up the head perpendicularly from the disk to prevent the head from contacting the disk. When this happens successively, this sounds like a buzzer) has been used. |
| S.M.A.R.T. | Offline Seek Performance | H/W | [209] Indicates the value of the performance of the seek function measured during off-line scanning. |
| S.M.A.R.T. | Disk Shift | H/W | The distance that the disk (platter) is shifted from an initially fixed position due to an impact or the like. |
| S.M.A.R.T. | Loaded Hours | S/W | Indicates the value of load on the magnetic head actuator produced during general operation. |

TABLE 1-continued

| SORCE | NAME | CLASS | Comment |
|---|---|---|---|
| S.M.A.R.T. | Load/Unload Retry Count | H/W | The number of times the loading/unloading mechanism has failed in loading or unloading and made retries. |
| S.M.A.R.T. | Load Friction | H/W | Indicates the value of the load on the magnetic head actuator due to friction of a mechanical part. |
| S.M.A.R.T. | Load-in Time | H/W | Inclusive sum of time during which the magnetic head actuator has been under load of data reading. |
| S.M.A.R.T. | Torque Amplification Count | H/W | Indicates the value of torque amplification force during rotation of the disk. |
| S.M.A.R.T. | GMR Head Amplitude | H/W | Amplitude of vibration during operation of the GMR magnetic head. |
| S.M.A.R.T. | Head Flying Hours | H/W | Time during which the magnetic head is positioning. |
| S.M.A.R.T. | Read Error Retry Rate | H/W | Frequency with which errors occur while reading data from the magnetic disk. |
| WMI | Win32_Processor.LoadPercentage | S/W | Usage rate of processor |
| WMI | Win32_LogicalDisk.FreeSpace | H/W | Free space of disk |
| WMI | Win32_PageFileUsage.CurrentUsage | S/W | Amount of page file used |
| WMI | Win32_OperatingSystem.FreePhisycalMemory | S/W | Free space of memory |
| WMI | Win32_OperatingSystem.FreeVirtualMemory | S/W | Free space of virtual memory |
| WMI | Win32_OperatingSystem.NumberOfProcess | S/W | Number of processes being started |
| WMI | Win32_Process.HandleCount | S/W | Number of handles |
| WMI | Win32_Process.PageFileUsage | S/W | Amount of page file used of process |
| WMI | Win32_Process.ReadOperationCount | S/W | Number of read instructions of process (accumulated) |
| WMI | Win32_Process.ReadTransferCount | S/W | Amount of reading data of process (accumulated) |
| WMI | Win32_Process.ThreadCount | S/W | Number of active threads of process |
| WMI | Win32_Process.VirtualSize | S/W | Amount of virtual memory used of process |
| WMI | Win32_Process.WorkingSetSize | S/W | Amount of memory used of process |
| WMI | Win32_Process.WriteOperationCount | S/W | Number of write instructions of process (accumulated) |
| WMI | Win32_Process.WriteTransferCount | S/W | Amount of writing data of process (accumulated) |
| SNMP | ifNumber | S/W | Number of interfaces provided in device |

TABLE 1-continued

| SORCE | NAME | CLASS | Comment |
|---|---|---|---|
| SNMP | ifOperStatus | S/W | Operation condition |
| SNMP | ifInOctets | S/W | Total number of received octets |
| SNMP | ifInUcastPkts | S/W | Number of received unicast packets |
| SNMP | ifInNUcastPkts | S/W | Number of received non-unicast packets |
| SNMP | ifInDiscards | S/W | Number of received packets discarded for reasons other than errors |
| SNMP | ifInErrors | S/W | Number of received packets resulting in errors |
| SNMP | ifInUnknownProtos | S/W | Number of packets discarded due to unsupported protocol |
| SNMP | ifOutOctets | S/W | Number of all transferred octets |
| SNMP | ifOutUcastPkts | S/W | Number of transmitted unicast packets |
| SNMP | ifOutNUcastPkts | S/W | Number of transmitted non-unicast packets |
| SNMP | ifOutDiscards | S/W | Number of transmission packets discarded for reasons other than errors |
| SNMP | ifOutErrors | S/W | Number of transmission packets resulting in errors |
| SNMP | ifOutQLen | S/W | Number of packets accumulated for output queue |
| SNMP | IDiskPercentDiskReadTime | S/W | |
| SNMP | IDiskPercentDiskTime | S/W | |
| SNMP | IDiskPercentDiskWriteTime | S/W | |
| SNMP | IDiskPercentFreeSpace | S/W | |
| SNMP | IDiskPercentIdleTime | S/W | |
| SNMP | IDiskAvgDiskQueueLength | S/W | |
| SNMP | IDiskAvgDiskReadQueueLength | S/W | |
| SNMP | IDiskAvgDiskWriteQueueLength | S/W | |
| SNMP | IDiskAvgDiskSecPerRead | H/W | |
| SNMP | IDiskAvgDiskSecPerTransfer | H/W | |
| SNMP | IDiskAvgDiskSecPerWrite | H/W | |
| SNMP | IDiskCurrentDiskQueueLength | S/W | |
| SNMP | IDiskDiskBytesPerSec | S/W | |
| SNMP | IDiskDiskReadBytesPerSec | S/W | |
| SNMP | IDiskDiskReadsPerSec | S/W | |
| SNMP | IDiskDiskTransfersPerSec | S/W | |
| SNMP | IDiskDiskWriteBytesPerSec | S/W | |
| SNMP | IDiskDiskWritesPerSec | S/W | |
| SNMP | IDiskFreeMegabytes | S/W | |
| SNMP | IDiskSplitIOPerSec | H/W | |
| SNMP | memoryAvailableMBytes | S/W | |
| SNMP | memoryCommittedBytes | S/W | |
| SNMP | memoryCacheBytes | S/W | |
| SNMP | memoryCacheBytesPeak | S/W | |
| SNMP | memoryPageFaultsPerSec | S/W | |
| SNMP | memoryPagesInputPerSec | S/W | |
| SNMP | memoryPagesOutputPerSec | S/W | |
| SNMP | memoryPagesPerSec | S/W | |
| SNMP | memoryPoolNonpagedBytes | S/W | |
| SNMP | memoryPoolPagedBytes | S/W | |
| SNMP | memoryPoolPagedResidentBytes | S/W | |
| SNMP | memorySystemCacheResidentBytes | S/W | |
| SNMP | memorySystemCodeResidentBytes | S/W | |
| SNMP | memorySystemCodeTotalBytes | S/W | |
| SNMP | memorySystemDriverResidentBytes | S/W | |
| SNMP | memorySystemDriverTotalBytes | S/W | |
| SNMP | objectsProcesses | S/W | |
| SNMP | objectsThreads | S/W | |
| SNMP | cpuPercentDPCTime | S/W | |

TABLE 1-continued

| SORCE | NAME | CLASS | Comment |
|---|---|---|---|
| SNMP | cpuPercentInterruptTime | S/W | |
| SNMP | cpuPercentPrivilegedTime | S/W | |
| SNMP | cpuPercentProcessorTime | S/W | |
| SNMP | cpuPercentUserTime | S/W | |
| SNMP | cpuAPCBypassesPerSec | S/W | |
| SNMP | cpuDPCBypassesPerSec | S/W | |
| SNMP | cpuDPCRate | S/W | |
| SNMP | cpuDPCsQueuedPerSec | S/W | |
| SNMP | cpuInterruptsPerSec | S/W | |
| SNMP | hrSystemInitialLoadDevice | — | |
| SNMP | hrSystemInitialLoadParameters | — | |
| SNMP | hrSystemNumUsers | — | |
| SNMP | hrSystemProcesses | S/W | |
| SNMP | hrSystemMaxProcesses | — | |
| SNMP | hrMemorySize | — | |
| SNMP | hrStorageAllocationUnits | S/W | |
| SNMP | hrStorageSize | S/W | |
| SNMP | hrStorageUsed | S/W | |
| SNMP | hrStorageAllocationFailures | S/W | |
| SNMP | hrDeviceStatus | — | |
| SNMP | hrDeviceErrors | H/W | |
| SNMP | hrSWRunPerfCPU | S/W | |
| SNMP | hrSWRunPerfMem | S/W | |
| SNMP | hrSWInstalledLastChange | — | |
| SNMP | hrSWInstalledLastUpdateTime | — | |
| SNMP | hrSWInstalledType | — | |
| SNMP | hrSWInstalledDate | — | |
| SNMP | mbmSensorType | — | |
| SNMP | mbmSensorCurrentS | H/W | |

What is claimed is:

1. An abnormal sign detection apparatus comprising:
a data acquisition portion configured to acquire string data made up of a plurality of monitoring items from an apparatus to be monitored at predetermined or arbitrary time intervals;
a unit space generation portion including
a data temporary storage configured to temporarily store each acquired string data;
a data calculation portion configured to calculate an average and variation for each of the monitoring items by using each string data stored in the data temporary storage; and
an information calculation portion configured to calculate correlation information indicating a correlation between the monitoring items by using each string data stored in the data temporary storage;
a normalization portion configured to normalize the string data acquired by the data acquisition portion using the average and the variation of each monitoring item;
a distance calculation portion configured to calculate a distance from the correlation information for normalized string data by carrying out a computation using the normalized string data and the correlation information; and
an abnormal sign decision portion configured to decide whether or not there is an abnormal sign in the apparatus to be monitored depending on whether or not calculated distance falls within a confidence interval set in advance for a certain probability distribution, wherein
the information calculation portion in the unit space generation unit calculates an inverse matrix of a correlation coefficient matrix among the monitoring items as the correlation information,
the distance calculation portion
calculates Mahalanobis' distance by carrying out a computation using the normalized string data and the inverse matrix of the correlation coefficient matrix
calculates a Euclid distance by carrying out a computation using the normalized string data and a unit matrix corresponding in number to the monitoring items, and
calculates the distance by dividing the Mahalanobis' distance by the Euclid distance.

2. The apparatus according to claim 1, wherein:
a first label or a second label is set for each of the monitoring items; and
the unit space generation unit includes a restart detection portion configured to detect that the apparatus to be monitored is restarted,
the data calculation portion in the unit space generation unit recalculates the average, the variation and the correlation information in a case that the second label is set in at least one of the monitoring items when the restart is detected.

3. The apparatus according to claim 1, further comprising a Pre-processing portion configured to perform pre-processing on the string data acquired by the data acquisition portion.

4. The apparatus according to claim 1, wherein the abnormal sign decision portion decides whether or not there is the abnormal sign in the apparatus to be monitored depending on whether or not a moving average of the distances falls within the confidence interval.

5. The apparatus according to claim 1, wherein the certain probability distribution is a chi-square distribution.

6. The apparatus according to claim 1, wherein the data acquisition portion acquires the string data made up of the plurality of monitoring items from a system to be monitored which has two or more apparatuses to be monitored at predetermined or arbitrary time intervals, and
the abnormal sign decision portion decides whether or not there is an abnormal sign in the system to be monitored.

7. An abnormal sign detection apparatus comprising:
a data acquisition portion including a first data acquisition portion configured to acquire first to nth string data each of which is made up of a plurality of monitoring items from an apparatus to be monitored at predetermined or arbitrary time intervals
a unit space generation portion including
a first data temporary storage configured to temporarily store acquired first to nth string data;
a first calculation portion configured to calculate an average and a variation for each of the monitoring items corresponding each of the first to nth string data and calculate correlation information indicating a correlation between the monitoring items for each of the first to nth string data, by using first to nth string data stored in the first data temporary storage; and
a first normalization portion configured to normalize each of the first to nth string data acquired by the first data acquisition portion using the average and the variation of each of the monitoring items corresponding each of the first to nth string data;
a distance calculation portion including a first distance calculation portion configured to calculate a distance from the correlation information for each of normalized first to nth string data by carrying out a computation using the normalized first to nth string data and the correlation information corresponding to each of the normalized first to nth string data; and
a probability calculation portion configured to calculate probabilities which correspond to respective calculated distances or less from the respective calculated distances and a certain probability distribution; wherein
the data acquisition portion includes a second data acquisition portion configured to acquire a string data having the respective calculated probabilities as monitoring items at predetermined or arbitrary time intervals;
the unit space generation portion includes
a second data temporary storage configured to temporarily store each acquired string data;
a second calculation portion configured to calculate an average and a variation for each of the monitoring items and second correlation information indicating a correlation between the monitoring items by using each string data stored in the second data storage; and
a second normalization portion configured to normalize the string data acquired by the second data acquisition portion using the average and the variation of each of the monitoring items;
a distance calculation portion includes a second distance calculation portion configured to calculate a second distance from the second correlation information for normalized string data by carrying out a computation using the normalized string data and the second correlation information; and
the abnormal sign detection apparatus further comprises an abnormal sign decision portion configured to decide whether or not there is an abnormal sign in the apparatus to be monitored depending on whether or not calculated second distance falls within a confidence interval set in advance for the certain probability distribution.

8. The apparatus according to claim 7, wherein the first data acquisition portion in the data acquisition portion acquires the first to nth string data from a system to be monitored which has two or more apparatuses to be monitored at predetermined or arbitrary time intervals, and
the abnormal sign decision portion decides whether or not there is an abnormal sign in the system to be monitored.

9. The apparatus according to claim 8, further comprising wherein:
a first label or a second label is set for each of the monitoring items corresponding each of the first to nth string data; and
the unit space generation portion includes a restart detection portion configured to detect that the apparatus in the system is restarted,
when the restart is detected and the second label is set in at least one of the monitoring items associated with restarted apparatus, the first calculation portion in the unit space generation unit recalculates the average, the variation and the correlation information from the string data having the monitoring items associated with the restarted apparatus, and
the second calculation portion recalculates the average, the variation, and the second correlation information.

10. An abnormal sign detection method comprising:
acquiring string data made up of a plurality of monitoring items from an apparatus to be monitored at predetermined or arbitrary time intervals;
storing each acquired string data in a data temporary storage temporarily;
calculating an average and variation for each of the monitoring items by using each string data stored in the data temporary storage;
calculating correlation information indicating a correlation between the monitoring items by using each string data stored in the data temporary storage;
calculating an average and variation for each of the monitoring items and correlation information indicating a correlation between the monitoring items by using each string data stored in the data temporary storage;
normalizing the acquired string data by using the average and the variation of each monitoring item;
calculating a distance from the correlation information for normalized string data by carrying out a computation using the normalized string data and the correlation information; and
deciding whether or not there is an abnormal sign in the apparatus to be monitored depending on whether or not calculated distance falls within a confidence interval set in advance for a certain probability distribution, wherein
the calculating correlation information includes calculating an inverse matrix of a correlation coefficient matrix among the monitoring items as the correlation information, and
the calculating a distance includes
calculating Mahalanobis' distance by carrying out a computation using the normalized string data and the inverse matrix of the correlation coefficient matrix,
calculating a Euclid distance by carrying out a computation using the normalized string data and a unit matrix corresponding in number to the monitoring items, and
calculating the distance by dividing the Mahalanobis' distance by the Euclid distance.

* * * * *